(12) United States Patent
Matsumoto et al.

(10) Patent No.: US 10,356,844 B2
(45) Date of Patent: Jul. 16, 2019

(54) COMMUNICATION DEVICE

(71) Applicant: NEC Communication Systems Ltd., Tokyo (JP)

(72) Inventors: Akira Matsumoto, Tokyo (JP); Peng Shao, Tokyo (JP); Yuki Baba, Tokyo (JP)

(73) Assignee: NEC Communication Systems Ltd., Minato-ku, Tokyo (JP)

( * ) Notice: Subject to any disclaimer, the term of this patent is extended or adjusted under 35 U.S.C. 154(b) by 268 days.

(21) Appl. No.: 15/503,140

(22) PCT Filed: Aug. 3, 2015

(86) PCT No.: PCT/JP2015/003907
§ 371 (c)(1),
(2) Date: Feb. 10, 2017

(87) PCT Pub. No.: WO2016/027428
PCT Pub. Date: Feb. 25, 2016

(65) Prior Publication Data
US 2017/0231030 A1    Aug. 10, 2017

(30) Foreign Application Priority Data

Aug. 19, 2014 (JP) .................... 2014-166550

(51) Int. Cl.
*H04W 88/02* (2009.01)
*H04L 12/413* (2006.01)
(Continued)

(52) U.S. Cl.
CPC .......... *H04W 88/02* (2013.01); *H04L 12/413* (2013.01); *H04W 28/12* (2013.01);
(Continued)

(58) Field of Classification Search
CPC .............. H04L 12/413; H04W 74/085; H04W 74/0858; H04W 28/12; H04W 72/082; H04W 84/12; H04W 88/02
See application file for complete search history.

(56) References Cited

U.S. PATENT DOCUMENTS

| 6,067,291 A * | 5/2000 | Kamerman ........... H04W 52/18 370/338 |
| 2007/0014269 A1 * | 1/2007 | Sherman ............... H04J 3/0661 370/338 |

(Continued)

FOREIGN PATENT DOCUMENTS

| JP | 4-24972 A | 1/1992 |
| JP | 08-116323 A | 5/1996 |

(Continued)

OTHER PUBLICATIONS

Novel collision detection scheme and its applications for IEEE 802.11 wireless LANs Yun et al. ScienceDirect (Year: 2007).*

(Continued)

Primary Examiner — Rina C Pancholi
(74) Attorney, Agent, or Firm — Sughrue Mion, PLLC

(57) ABSTRACT

A communication device includes a wireless communication unit, an in-transmission information generating unit, and a neighboring signal presence information generating unit. The wireless communication unit transmits and receives wireless frames via an antenna. The in-transmission information generating unit generates in-transmission information representing whether or not a wireless frame is being transmitted from the antenna. The neighboring signal presence information generating unit generates neighboring signal presence information representing whether or not a signal of a predetermined level or higher is present on a wireless channel that is the same as a wireless channel of the wireless frame. The collision detection unit determines a (Continued)

transmission end point of the wireless frame transmitted from the wireless communication unit based on the in-transmission information, determines whether or not there is a signal of the predetermined level or higher on the wireless channel through which the wireless frame is transmitted within a period from the determined transmission end point until a first time elapses, based on the neighboring signal presence information, and determines whether or not the transmitted wireless frame collided with another wireless frame, based on the determination made based on the neighboring signal presence information.

17 Claims, 16 Drawing Sheets

(51) Int. Cl.
H04W 28/12 (2009.01)
H04W 72/08 (2009.01)
H04W 84/12 (2009.01)
H04W 74/08 (2009.01)

(52) U.S. Cl.
CPC ..... *H04W 72/082* (2013.01); *H04W 74/0858* (2013.01); *H04W 84/12* (2013.01)

(56) References Cited

U.S. PATENT DOCUMENTS

2015/0016309 A1* 1/2015 Fang ............... H04L 5/14
370/277

2015/0365971 A1* 12/2015 Chen ............... H04W 74/0816
370/252

FOREIGN PATENT DOCUMENTS

| JP | 09-051327 A | 2/1997 |
| JP | 10-271062 A | 10/1998 |
| JP | 2005-244857 A | 9/2005 |
| JP | 2006-197177 A | 7/2006 |
| JP | 2007-096902 A | 4/2007 |
| JP | 2013-005097 A | 1/2013 |
| JP | 2014-068134 A | 4/2014 |
| WO | 2007/091738 A1 | 8/2007 |
| WO | 2015/063993 A1 | 5/2015 |

OTHER PUBLICATIONS

Communication dated Apr. 3, 2018 from the Japanese Patent Office in counterpart Application No. 2016-543804.
"Part 11: Wireless LAN Medium Access Control (MAC) and Physical Layer (PHY) Specifications", IEEE Computer Society, 2012.
"Information technology—Open Systems Interconnection—Basic Reference Model: The Basic Model", ISO/IEC 7498-1, 1994.
Vipin M et al., "Analysis of Open Source Drivers for IEEE 802.11 WLANs", IEEE, 2010.
"Fwd FW Channel busy cycles", <URL: permalink.gmane.org/gmane.linux.drivers.ath9k.devel/9887>, (searched on Aug. 5, 2014).
International Search Report for PCT/JP2015/003907 dated Oct. 20, 2015.

* cited by examiner

FIG. 5

| TYPE OF TRANSMITTED FRAME | Ts | Te |
|---|---|---|
| Data FRAME | DIFS | SIFS |
| Ack FRAME | SIFS | DIFS |

COMMUNICATION DEVICE

CROSS REFERENCE TO RELATED APPLICATIONS

This application is a National Stage of International Application No. PCT/JP2015/003907 filed Aug. 3, 2015, claiming priority based on Japanese Patent Application No. 2014-166550 filed Aug. 19, 2014, the contents of all of which are incorporated herein by reference in their entirety.

TECHNICAL FIELD

The present invention relates to a communication device, a collision detection method, and a program.

BACKGROUND ART

In recent years, wireless LAN (Local Area Network) communications have been used not only in offices but also in wide areas such as homes and outdoor. Along with widespread use of the wireless LAN, the amount of communications in limited frequency resources increases, whereby communication interference with each other has become a serious problem.

In IEEE802.11 which is one of the wireless LAN standards, an access control method of carrier sense multiple access with collision avoidance (CSMA/CA) is used (see Patent Document 1 and Non-Patent Document 1). In this access control method, when each communication device (wireless communication device) attempts to transmit a wireless frame, it checks whether or not neighboring communication devices are sending radio waves before starting transmission of a wireless frame.

Further, in the aforementioned access control method, in order to avoid collision of wireless frames, when any neighboring communication device is sending a radio wave, a communication device waits for a certain period of time (back-off time), and then checks again whether or not a radio wave is sent, and if any neighboring communication device is not sending a radio wave, the communication device transmits a radio wave by itself after a random time elapses. The communication device uses carrier sense to check whether or not neighboring communication devices are not sending radio waves.

A communication device checks a use state of a wireless channel by using carrier sense. When detecting preamble of a signal (signal for establishing synchronization) conforming to the IEEE802.11 standard, the communication device receives the signal, so that the state becomes a wireless channel in-use state (busy). When the communication device does not detect preamble of a signal conforming to the IEEE802.11 standard and detects an electric power level higher than a preset carrier sense threshold, the communication device determines that the state is busy, and stands by for transmission. Meanwhile, when detecting an electric power level lower than a carrier sense threshold, the communication device determines that the wireless channel is not used (idle).

Patent Document 2 discloses a technology as described below. In a communication system in which two base stations are able to perform transmission simultaneously, when data to be transmitted is generated, each base station transmits transmission notice information in a frame immediately before starting transmission of the data. A mobile station measures an interference level based on the received transmission notice information, determines a request rate from the measured interference level, and notifies the based station of it. The base state transmits data by using the request rate as a downstream data rate. Then, the based state checks whether or not the data is being transmitted, and when it is being transmitted, transmits in-transmission information. The mobile station measures the interference level based on the received in-transmission information, determines a request rate, and notifies the base station of it.

Patent Document 3 discloses a communication device in which interference with other communications is suppressed, and data transmission efficiency is improved. Specifically, a communication device includes a data transmission and reception unit that wirelessly transmits a plurality of test packets, a signal sensing unit that senses electric power of a spatial radio wave signal on a frequency channel that is the same as the that of the test packets and outputs sample data of the spatial radio wave signal, a calculation processing unit that converts the sample data into time-series sample data that is data in which sample data is plotted in a time-series manner, and a collision detection unit that determines packet collision due to interference between the test packets and other communications based on the time-series sample data.

Patent Document 1: WO2007/091738 A
Patent Document 2: JP 2005-244857 A
Patent Document 3: JP 2013-5097 A
Non-Patent Document 1: Wireless LAN Standard IEEE802.11
Non-Patent Document 2: ISO-IEC 7498-1
Non-Patent Document 3: Analysis of Open Source Drivers for IEEE 802.11
Non-Patent Document 4: Fwd FW Channel busy cycles, [searched on Aug. 5, 2014], Internet <URL: http://permalink.gmane.org/gmane.linux.drivers.ath9k.devel/9887>

SUMMARY

Meanwhile, in the case where a communication device transmits wireless frames while moving, there is a case where collision of wireless frames may occurs by external interference along with the movement of the communication device. FIG. 16 shows an example of such a case. FIG. 16 illustrates four communication devices namely communication devices A, B, C, and D. In the wireless communication available area of the communication device A, the communication device B exists, and the communication devices C and D exist outside the wireless communication available area of the communication device A. Further, in the wireless communication available area of the communication device C, the communication device D exists, and the communication devices A and B exist outside the wireless communication available area of the communication device C. In such a situation, it is assumed that the communication device A begins transmission of a wireless frame to the communication device B, and the communication device C begins transmission of a wireless frame to the communication device D. At the point of time when transmission of a wireless frame starts, the wireless frame transmitted by the communication device A reaches the communication device B but does not reach the communication devices C and D, while the wireless frame transmitted by the communication device C reaches the communication device D but does not reach the communication devices A and B. Therefore, communication collision by external interference does not occur. However, when the communication device C moves in the arrow direction in FIG. 16 while transmitting a wireless frame so that the communication devices A and B come into the wireless communication available area of the communication device C, for example, the communication device B cannot receive the wireless frame transmitted from the communication device to the end because the wireless frame transmitted from the communication device C causes external interference.

In the access control method of CSMA/CA standardized in IEEE802.11, after starting transmission of a wireless frame, each communication device does not check whether or not the neighboring communication devices are sending electric waves. As such, collision of wireless frames as illustrated in FIG. 16 cannot be detected. Meanwhile, in the communication device described in Patent Document 3, as electric power of spatial electric wave signals are sensed after transmission of a wireless frame is started, collision of wireless frames as illustrated in FIG. 16 can be detected. However, in the communication device described in Patent document 3, relatively complicated processing is required such as sensing electric power of spatial electric wave signals, converting sample data of the sensed spatial electric wave signals into time-series sample data in which the sample data is plotted in a time-series manner, and based on the time-series sample data, determining packet collision due to interference between a packet transmitted from the own communication device and other communications.

An exemplary object of the present invention is to provide a communication device that solves the above-described problem, that is, a problem that processing to detect collision of wireless frames after the start of communications is complicated.

A communication device, according to a first aspect of the present invention, is a communication device having a wireless communication unit that transmits and receives a wireless frame via an antenna. The communication device includes an in-transmission information generating unit that generates in-transmission information representing whether or not the wireless frame is being transmitted from the antenna;

a neighboring signal presence information generating unit that generates neighboring signal presence information representing whether or not a signal of a predetermined level or higher is present on a wireless channel that is the same as a wireless channel of the wireless frame; and a collision detection unit that determines a transmission end point of the wireless frame transmitted from the wireless communication unit based on the in-transmission information, determines whether or not there is a signal of the predetermined level or higher on the wireless channel through which the wireless frame is transmitted within a period from the determined transmission end point until a first time elapses, based on the neighboring signal presence information, and determines whether or not the transmitted wireless frame collided with another wireless frame, based on the determination made based on the neighboring signal presence information.

A collision detection method, according to a second aspect of the present invention, is a collision detection method performed by a communication device having a wireless communication unit that transmits and receives a wireless frame via an antenna. The method includes generating in-transmission information representing whether or not the wireless frame is being transmitted from the antenna;

generating neighboring signal presence information representing whether or not a signal of a predetermined level or higher is present on a wireless channel that is the same as a wireless channel of the wireless frame; and determining a transmission end point of the wireless frame transmitted from the wireless communication unit based on the in-transmission information, determining whether or not there is a signal of the predetermined level or higher on the wireless channel through which the wireless frame is transmitted within a period from the determined transmission end point until a first time elapses, based on the neighboring signal presence information, and determining whether or not the transmitted wireless frame t collided with another wireless frame, based on the determination made based on the neighboring signal presence information.

A program, according to a third aspect of the present invention, causes a computer, having a wireless communication unit that transmits and receives a wireless frame via an antenna, to function as:

an in-transmission information generating unit that generates in-transmission information representing whether or not the wireless frame is being transmitted from the antenna;

a neighboring signal presence information generating unit that generates neighboring signal presence information representing whether or not a signal of a predetermined level or higher is present on a wireless channel that is the same as a wireless channel of the wireless frame; and a collision detection unit that determines a transmission end point of the wireless frame transmitted from the wireless communication unit based on the in-transmission information, determines whether or not there is a signal of the predetermined level or higher on the wireless channel through which the wireless frame is transmitted within a period from the determined transmission end point until a first time elapses, based on the neighboring signal presence information, and determines whether or not the transmitted wireless frame collided with another wireless frame, based on the determination made based on the neighboring signal presence information.

As the present invention has the configuration described above, it is possible to simplify the process of detecting collision of wireless frames after the start of communications.

BRIEF DESCRIPTION OF DRAWINGS

FIG. 5 illustrates an exemplary configuration of a table used for determining a period of time by a storage time determination unit of a communication device according to the second exemplary embodiment of the present invention.

EXEMPLARY EMBODIMENTS

[First Exemplary Embodiment]

Next, a first exemplary embodiment of the present invention will be described in detail with reference to the drawings.

[Configuration]

Figure 1:
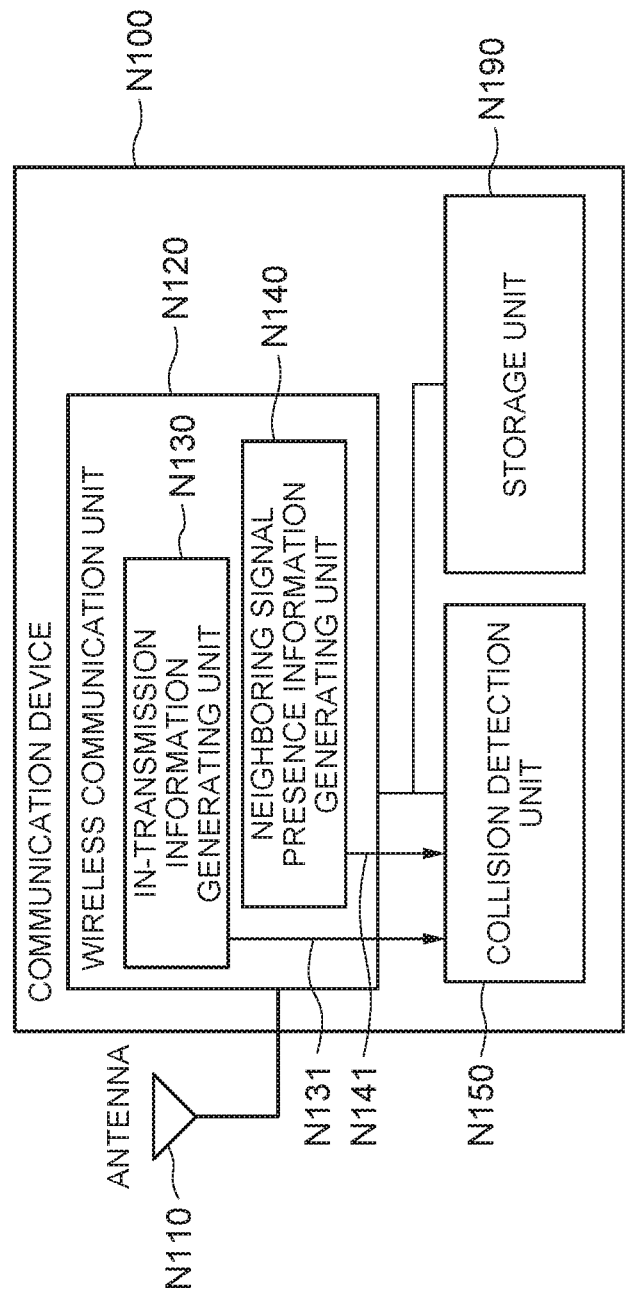
FIG. 1 is a block diagram of a communication device according to a first exemplary embodiment of the present invention.

Referring to FIG. 1, a communication device N100 according to the first exemplary embodiment of the present invention includes an antenna N110, a wireless communication unit N120, a collision detection unit N150, and a storage unit N190.

The wireless communication unit N120 has a function of converting data to be transmitted into radio wave signals (frames) using a system conforming to IEEE802.11 described in Non-Patent Document 1, for example, and transmitting them from the antenna N110, while converting signals (frames) received from the antenna N110 into data and receiving them. The communication device N100 is able to exchange data with another communication device having the same configuration as that of the communication device N100, for example, by using the wireless communication unit N120.

The wireless communication unit N120 includes an in-transmission information generating unit N130 that periodically generates in-transmission information N131 representing that signals are being transmitted from the antenna N110 and outputs it to the collision detection unit N150, and a neighboring signal presence information generating unit N140 that periodically generates neighboring signal presence information N141 that is information relating to signals existing around and outputs it to the collision detection unit N150, and also stores it in the storage unit N190. Cycles of generating the in-transmission information N131 and the neighboring signal presence information N141 are arbitrary. It is possible to increase the collision detection accuracy by decreasing the cycle, but the throughput is increased. In contrast, while the throughput is decreased by increasing the cycle, the collision detection accuracy deteriorates. Accordingly, the cycle is determined by comparatively considering the two factors, namely collision detection accuracy and throughput.

The in-transmission information N131 is information representing whether or not signals are being transmitted currently. The in-transmission information generating unit N130 can realize generation and output of the in-transmission information N131 with a system of setting the flag ON at the time when the wireless communication unit N120 transmits signals and setting the flag OFF in other time.

The neighboring signal presence information N141 is information representing whether or not there is a signal having a level equal to or higher than a threshold $\alpha$ or higher around the own communication device N100, in which a flag is ON when there is a signal while a flag is OFF when there is no signal. The wireless communication unit N120 has a circuit that receives signals. As such, with a system in which a flag is ON when the signal receiving circuit of the wireless communication unit N120 is receiving a signal of a level higher than the threshold $\alpha$ while a flag is OFF in the other case, the neighboring signal presence information generating unit N140 can realize generation and output of the neighboring signal presence information N141.

To check the presence of a signal having a level equal to or higher than the threshold $\alpha$, a method of comparing average electric power per unit time with the threshold $\alpha$, or a method using RSSI (Received Signal Strength Indicator) defined in IEEE802.11 described in Non-Patent Document 1 may be used, for example. However, another method may also be used. Moreover, the neighboring signal presence information N141 may be ON when the communication device N100 itself is transmitting a signal (when in-transmission information N131 is ON). The threshold $\alpha$ is a value fixedly determined in advance depending on the receiving performance of the wireless communication unit N120. For example, a value of lowest receiving sensitivity of the wireless communication unit N120 can be used.

The collision detection unit N150 has a function of determining presence or absence of collision between a frame transmitted by the wireless communication unit N120 and another frame, based on the in-transmission information N131 and the neighboring signal presence information N141 output from the wireless communication unit N120, and on the past neighboring signal presence information N141 stored in the storage unit N190.

The storage unit N190 has a function of storing the neighboring signal presence information N141 output from the wireless communication unit N120 for a certain period of time.

The antenna N110 is not limited to one, particularly. Two or more antennas may be used with a diversity technology, for example.

The in-transmission information generating unit N130, the neighboring signal presence information generating unit N140, and the collision detection unit N150 can be realized by a computer such as a microprocessor and a program, for example. A program is provided by being stored on a computer-readable storage medium such as a semiconductor memory or a magnetic disk device and is read by the computer when the computer is started. The program controls operation of the computer to thereby realize the in-transmission information generating unit N130, the neighboring signal presence information generating unit N140, and the collision detection unit N150 on the computer. In other embodiments described below, they can be realized by a computer and a program, similarly.

[Operation]

Figure 2:
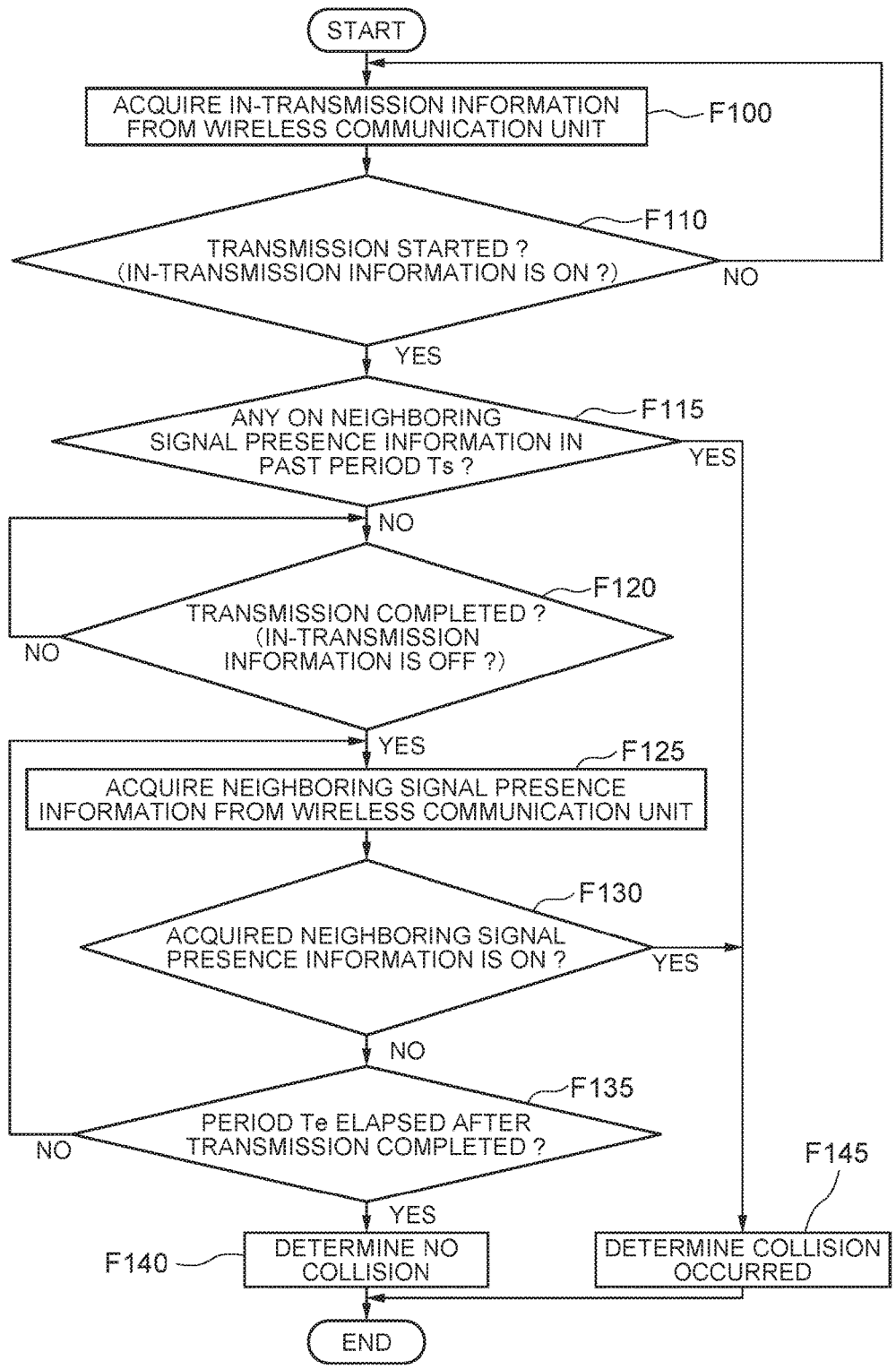
FIG. 2 is a flowchart illustrating an example of collision detecting operation of a communication device according to the first exemplary embodiment of the present invention.

Next, operation of the present embodiment will be described in detail with reference to the flowchart of FIG. 2. FIG. 2 illustrates a flow of collision detection determination process at the time of transmitting a signal in the communication device N100. While an example using a communication system of IEEE802.11 of Non-Patent Literature 1 is shown, the present invention is not limited to it. Any communication system can be used if it performs CSMA/CA.

It is assumed that the storage unit N190 regularly stores the neighboring signal presence information N141 for a period of time Ts, taken from the wireless communication unit N120. This means that the storage unit N190 stores the neighboring signal presence information N141 output in the past certain period of time Ts. This can be realized by using an existing technology, that is, ring buffer, for example. Here, a value of the time Ts is determined depending on the communication system to be used, and is a time that must be taken at minimum before a transmission frame of its own. For example, in IEEE802.11 of Non-Patent Document 1, a time called DIFS (Distributed Coordination Function Interframe Space) must be taken without sending anything, before the own frame. A value of DIFS may be 34 microseconds in the case of using an OFDM (Orthogonal Frequency-division Multiplexing) communication system and a DCF (Distributed Coordination Function) communication system, and a channel width of 20 MHz.

Meanwhile, with reference to the flowchart of FIG. 2, the collision detection unit N150 acquires the in-transmission information N131 from the wireless communication unit N120 (F100). Then, the collision detection unit N150 checks the acquired in-transmission information N131, and determines whether or not transmission has started in the wireless communication unit N120 in the communication device N100 (F110). When transmission has not started, the collision detection unit N150 returns to step F100, and repeats the same process as that described above. When it determines that transmission is being performed, (F110: Yes), the collision detection unit N150 refers to the neighboring signal presence information N141 for the period Ts stored in the storage unit N190, and determines whether or not there is one that becomes ON within the period Ts (F115). Here, as a method of determination, values of the neighboring signal presence information N141 stored in the storage unit N190 are referred to from the time when the in-transmission information is ON toward the past time, and if there is ON at least once, it is determined that there is collision.

When there is at least one piece of in-transmission information that is ON within the period Ts (F115: Yes), the collision detection unit N150 determines that there is collision, and ends the process (F145). If there is no ON (F115: No), the collision detection unit N150 waits until transmission is completed (F120: No). When transmission is completed (F120: Yes), the collision detection unit N150 checks the neighboring signal presence information N141 for a certain period Te. This means that the collision detection unit N150 acquires the neighboring signal presence information N141 from the wireless communication unit N120 (F125), and determines whether or not the neighboring signal presence information N141 is ON (F130). When it is ON (F130: Yes), the collision detection unit N150 determines that there is collision and ends the process. When it is OFF (F130: No), the collision detection unit N150 determines whether or not the period Te has elapsed from completion of the transmission (F135). When the period Te has not elapsed (F135: No), the collision detection unit N150 returns to F125, and performs determination on the next neighboring signal presence information N141. When the period Te has elapsed, the collision detection unit N150 determines that there is no collision.

Here, the threshold Te is determined depending on the communication system, which is similar to the case of Ts. For example, in the case of a communication system of IEEE802.11 described in Non-Patent Document 1, the period Te is a period of time called SIFS (Short Interframe Space), and is 16 microseconds when the OFDM communication system and the DCF communication system are used and the channel width is 20 MHz.

[Description of Advantageous Effect]

As described above, according to the present embodiment, collision between one wireless frame and another wireless frame, after starting transmission of the one wireless frame, can be detected, because the collision detection unit N150 determines presence or absence of collision between the one wireless frame and another wireless frame based on whether or not there is a signal of a predetermined level or higher, within a period from the point of time when transmission of the wireless frame, transmitted from the wireless communication unit N120, ends until the predetermined period Te has elapsed. Accordingly, it is possible to detect collision of wireless frames that occurs in a condition described with reference to FIG. 16, for example. Hereinafter, this point will be described in detail.

Figure 16:
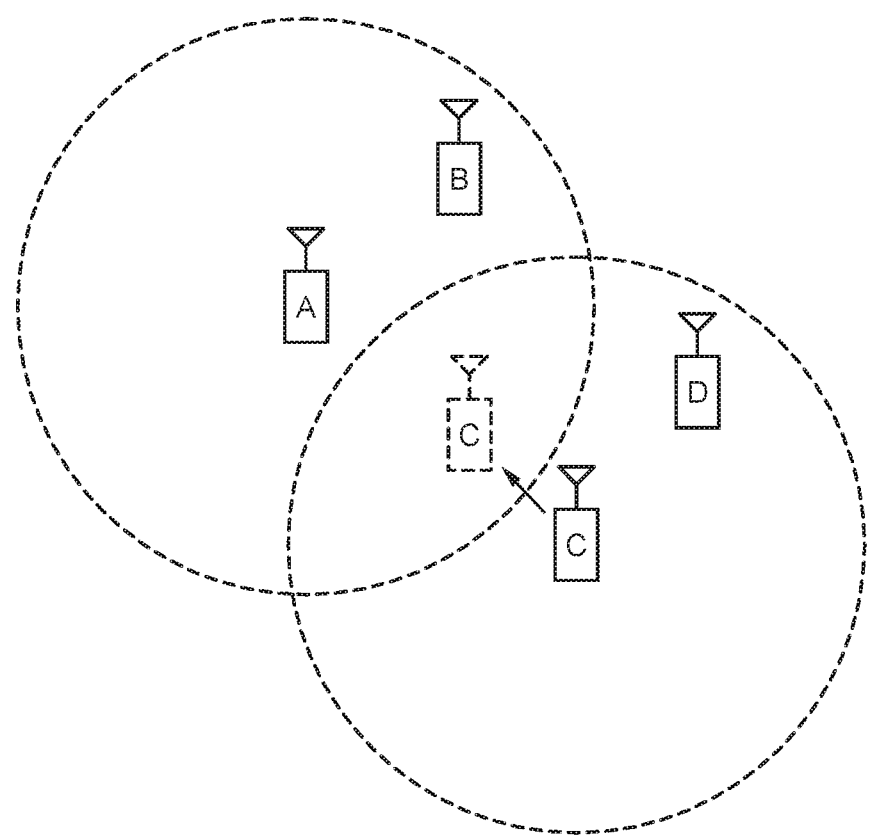
FIG. 16 is an illustration explaining an example of a situation where collision with another wireless frame occurs after transmission of a wireless frame.

In the present embodiment, each of the communication devices A to D illustrated in FIG. 16 has a configuration which is the same as that of the communication device N100 illustrated in FIG. 1. Further, the wireless communication unit N120 performs transmission and reception of wireless frames by using an access control method of CSMA/CA of IEEE802.11 described in Non-Patent Document 1.

In the initial state, in the wireless communication available area of the communication device A, a communication device B exists, and the communication devices C and D exist outside the wireless communication available area of the communication device A. Further, in the wireless communication available area of the communication device C, the communication device D exists, and the communication devices A and B exist outside the wireless communication available area of the communication device C. In such a situation, it is assumed that the communication device A begins transmission of a wireless frame to the communication device B, and the communication device C begins transmission of a wireless frame to the communication device D. At a point of time when transmission of the wireless frames starts, the wireless frame transmitted by the communication device A reaches the communication device B, but does not reach the communication devices C and D, and the wireless frame transmitted by the communication device C reaches the communication device D but does not reach the communication devices A and B. Accordingly, communication collision due to external interference does not occur.

Figure 3:
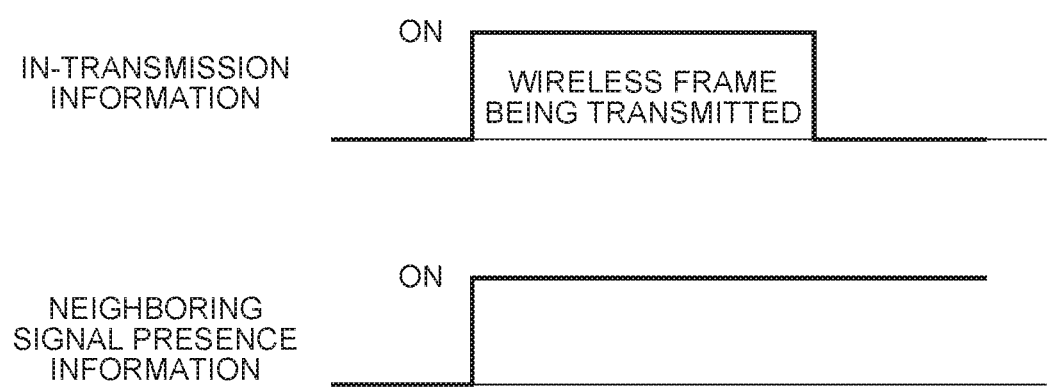
FIG. 3 illustrates exemplary states of in-transmission information and neighboring signal presence information when frame collision occurs in a communication device according to the first exemplary embodiment of the present invention.

Then, it is assumed that the communication device C moves in the arrow direction shown in the drawing while transmitting wireless frames, whereby the communication devices A and B are in the wireless communication available area of the communication device C, for example. In that case, the communication device B is not able to accurately receive the wireless frame transmitted from the communication device A until the end, because the wireless frame transmitted from the communication device C causes external interference. At that time, if wireless frames are continuously transmitted from the communication device C after the end of transmission of the wireless frame from the communication device A, the in-transmission information N131 and the neighboring signal presence information N141 of the communication device A are those as shown in FIG. 3, for example. This means that the in-transmission information N131 of the communication device A is ON within a period when wireless frames are transmitted from the communication device A, and the neighboring signal presence information N141 is ON within a period when wireless frames are transmitted from the communication device A and also ON even after the transmission of wireless frames from the communication device A, due to an effect of the wireless frames from the communication device C. Consequently, the collision detection unit N150 determines that there is collision between wireless frames.

Further, according to the present embodiment, it is possible to simplify the process of detecting collision between a wireless frame, after transmission thereof is started, and another wireless frame. This is because collision detection is not performed during a period when the own communication device N100 is transmitting wireless frames, and collision detection is performed before and after transmission of wireless frames, so that it is not necessary to perform a relatively complicated process to convert sample data of sensed spatial radio wave signals into time-series data in which sample data is plotted in a time-series manner and determine packet collision due to interference between a packet transmitted from the own communication device with other communications, based on the time-series sample data.

Further, according to the present embodiment, a threshold α in the neighboring signal presence information N141, representing whether or not there is a signal equal to or higher than the level of the threshold α, is set to a level lower than the threshold of carrier sense executed by the wireless communication unit N120, whereby collision between wireless frames at the time of starting transmission of a wireless frame can be detected. This means that when the electric power of the interference frame is smaller than the threshold of the carrier sense, each communication device is not able to detect presence of each transmission frame correctly. As such, a busy state of the channel cannot be determined correctly. As a result, collision between a wireless frame transmitted by the own communication device and an undetected interference frame occurs. By setting the threshold α to a level smaller than the threshold of the carrier sense, such an interference frame can be detected. Accordingly, collision at the time of starting transmission of a wireless frame can be detected. Further, in the wireless LAN (CSMA/CA), collision occurs when random times included in DIFS match incidentally. According to the present embodiment, such collision can be detected when the own frame is shorter than the interference frame.

[Second Exemplary Embodiment]

Next, a second exemplary embodiment of the present invention will be described in detail with reference to FIG. 4.

[Configuration]

Figure 4:
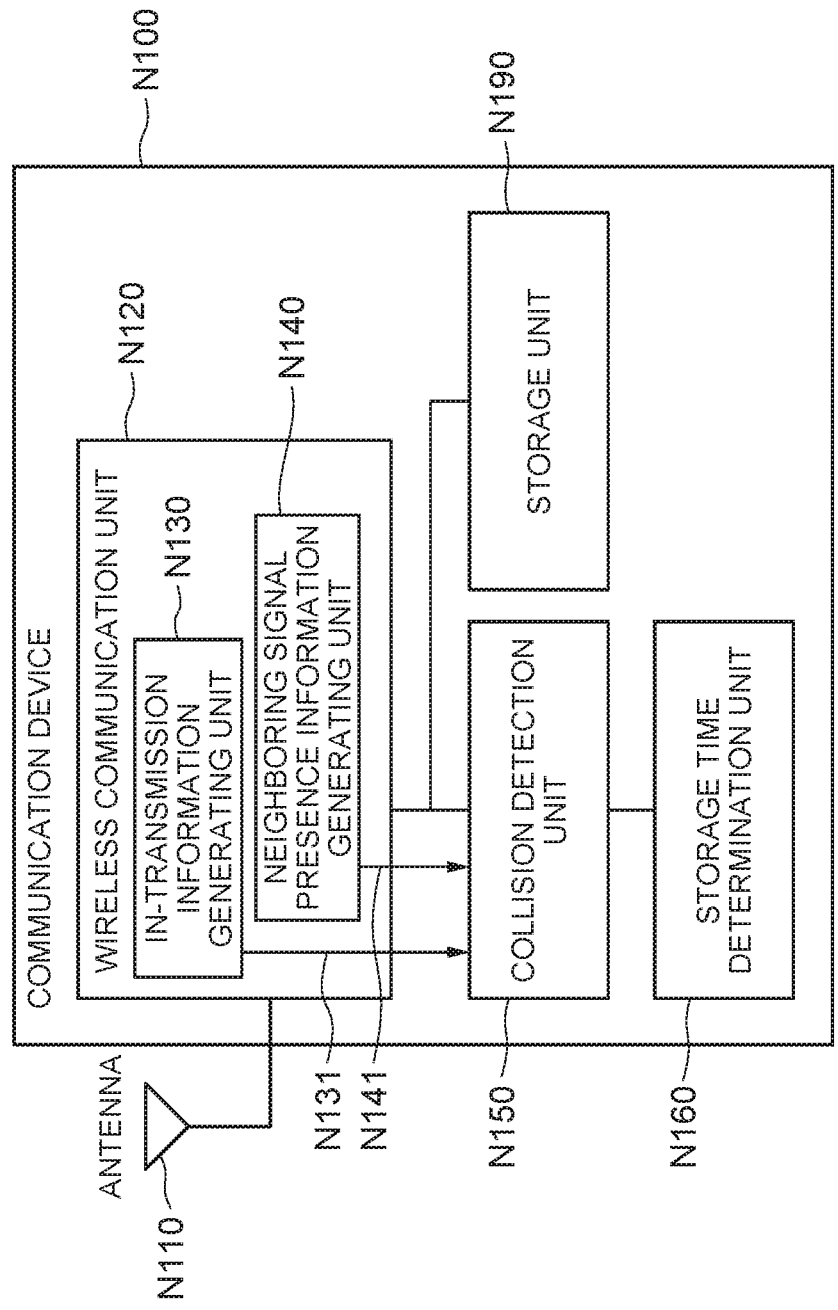
FIG. 4 is a block diagram of a communication device according to a second exemplary embodiment of the present invention.

Referring to FIG. 4, a communication device N100 according to the second exemplary embodiment of the present invention further includes a storage time determination unit N160, in addition to a wireless communication unit N120, a collision detection unit N150, and a storage unit N190 each having the same function as that in the communication device N100 according to the first exemplary embodiment of the present invention illustrated in FIG. 1.

[Operation]

The storage time determination unit N160 has a function of acquiring, from the wireless communication unit N120, information of the type of a frame to be transmitted, and determining the periods Ts and Te according to the type of the frame. For example, when the the wireless communication unit N120 transmits a Data frame defined in IEEE802.11 described in Non-Patent Document 1, the storage time determination unit N160 determines Ts=DIFS and Te=SIFS. Further, the when wireless communication unit N120 transmits an Ack frame, the storage time determination unit N160 determines Ts=SIFS and Te=DIFS.

FIG. 5 illustrates an exemplary configuration of a table used for determining the periods Ts and Te by the storage time determination unit N160. The table of this example holds information of Ts and Te for each frame type to be transmitted. The table is stored in the storage unit N190, for example. The storage time determination unit N160 acquires the type of a frame transmitted from the wireless communication unit N120, and acquires information of Ts and Te held in the table corresponding to the acquired frame type. In the example shown in FIG. 5, DIFS and SIFS are described as information of Ts and Te, and the specific times (34 microseconds, 16 microseconds, and the like) of DIFS and SIFS are managed separately. However, specific times may be held in the table of FIG. 5.

Operation of the collision detection unit N150 is the same as that in the first exemplary embodiment except that collision is detected using Ts and Te determined by the storage time determination unit N160. For example, when the collision detection unit N150 detects that transmission has started at step F110 of FIG. 2, the collision detection unit N150 acquires the type of the frame, the transmission of which has started, from the wireless communication unit N120 and notifies the storage time determination unit N160 of it, and executes steps F115 and F135 using Ts and Te determined by the storage time determination unit N160.

[Third Exemplary Embodiment]

Figure 6:
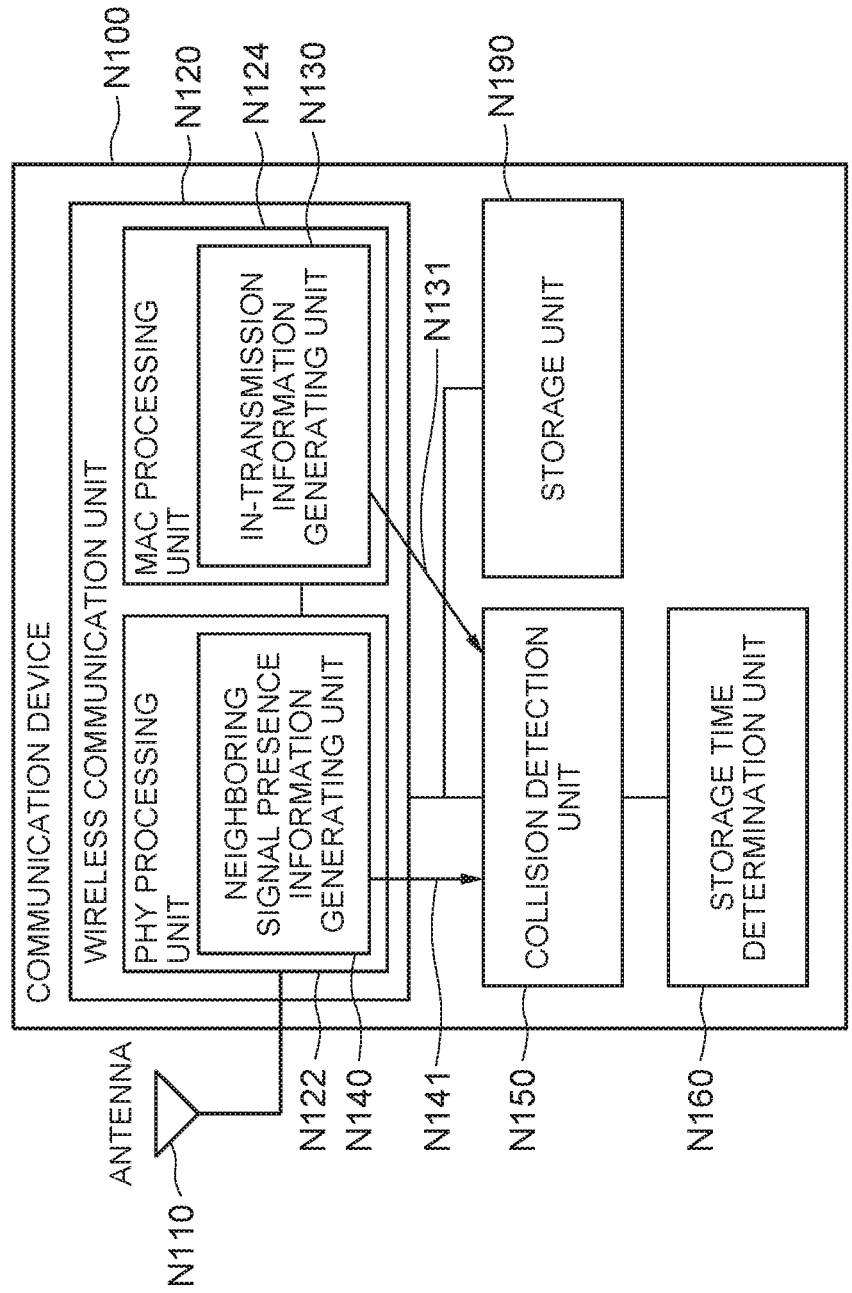
FIG. 6 is a block diagram of a communication device according to a third exemplary embodiment of the present invention.

Next, a third exemplary embodiment of the present invention will be described in detail with reference to FIG. 6.

[Configuration]

The present embodiment specifies, in more detail, the internal configuration of the wireless communication unit N120 of the communication device N100 according to the second exemplary embodiment of the present invention illustrated in FIG. 4. The wireless communication unit N120 of the communication device N100 according to the present embodiment includes a PHY processing unit N122 and a MAC processing unit N124.

The PHY processing unit N122 is a part that performs processing of a physical layer (PHY layer) in the seven-story layers of OSI shown in Non-Patent Document 2, and the MAC processing unit N124 is a part that performs processing of a data link layer in the seven-story layers of OSI. For example, in the PHY processing unit N122, PHY processing (PLCP Sublayer, PMD Sublayer, PHY Sublayer Management Entity) defined in IEEE802.11 described in Non-Patent Document 1 is performed. Further, in the MAC processing unit N124, MAC processing (MAC Sublayer, MAC Sublayer Management Entity, and the like) defined in IEEE802.11 described in Non-Patent Document 1 is performed.

Further, the wireless communication unit N120 has an in-transmission information generating unit N130 that generates in-transmission information N131 representing that a signal is being transmitted from the antenna N110, and outputs it to the collision detection unit N150. The in-transmission information generating unit N130 of the present embodiment outputs information representing whether or not data is being transmitted from the MAC processing unit N124 to the PHY processing unit N122, as in-transmission information N131. Specifically, the in-transmission information generating unit N130 has a mechanism in which the flag is ON when data, to be transmitted as radio waves from the antenna N110, is being transmitted from the MAC processing unit N124 to the PHY processing unit N122, while the flag is OFF in other cases.

Further, the wireless communication unit N120 has a neighboring signal presence information generating unit N140 that generates neighboring signal presence information N141 that is information relating to a signal existing around, and outputs it to the collision detection unit N150 and stores it in the storage unit N190. The neighboring signal presence information generating unit N140 of the present embodiment outputs, as the neighboring signal presence information N141, information representing whether or not there is a signal of a level equal to or higher than the threshold α as flags (ON, OFF) in a part that receives a signal from the antenna in the PHY processing unit N122.

The other configurations of the communication device N100 are the same as the configurations of the communication device N100 according to the second exemplary embodiment illustrated in FIG. 4.

[Operation]

Figure 7:
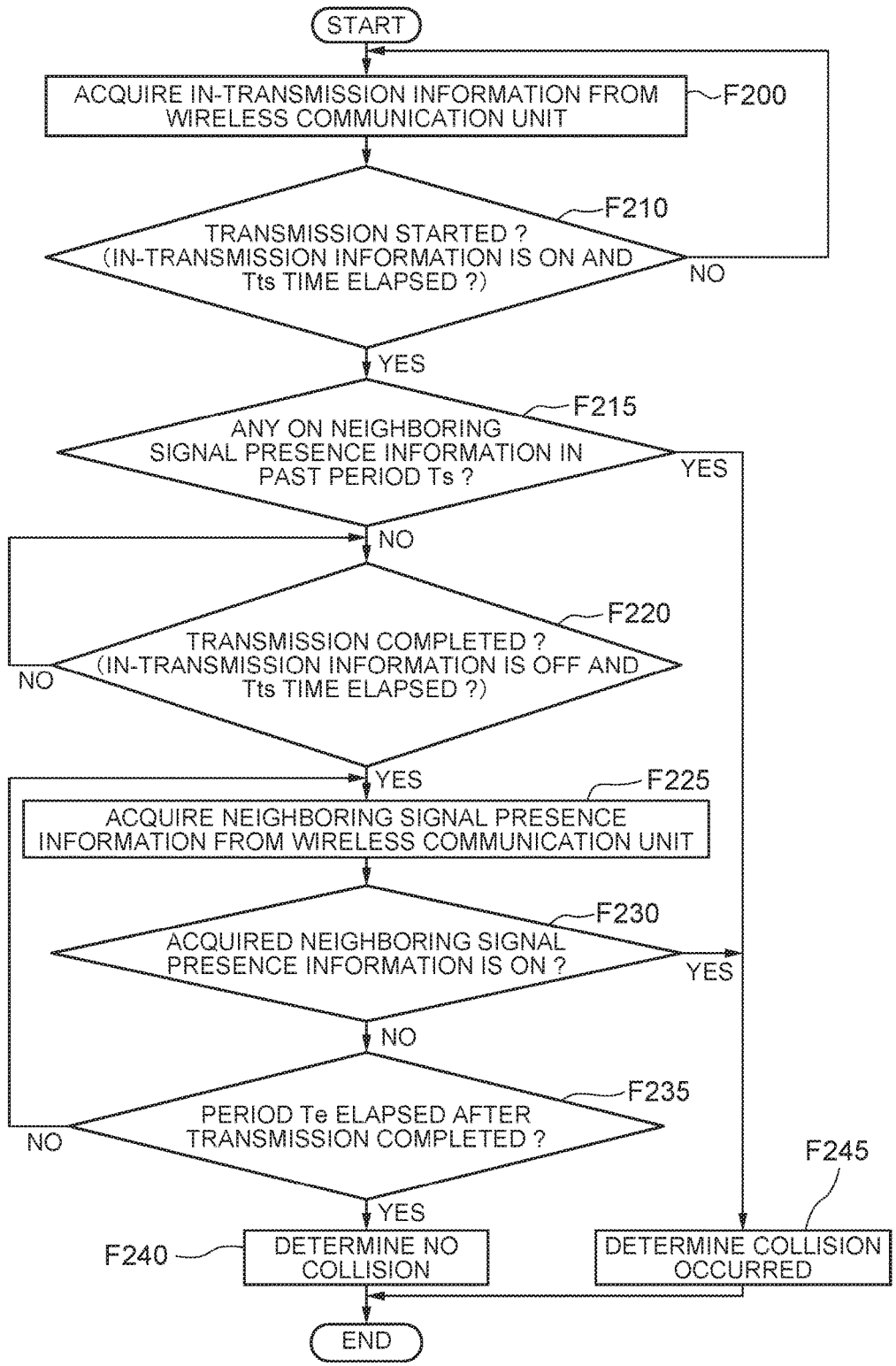
FIG. 7 is a flowchart showing an example of collision detecting operation of a communication device according to the third exemplary embodiment of the present invention.

Next, operation of the present embodiment will be described in detail with reference to the flowchart of FIG. 7. FIG. 7 shows a flow of collision detection determination process at the time of transmitting a signal in the communication device N100.

With reference to the flowchart of FIG. 7, the collision detection unit N150 acquires the in-transmission information N131 from the wireless communication unit N120 (F200). Next, the collision detection unit N150 checks the acquired in-transmission information N131, and determines whether or not transmission has started in the wireless communication unit N120 in the communication device N100 (F210). In the present embodiment, the in-transmission information N131 is information representing whether or not data is being transmitted from the MAC processing unit N124 to the PHY processing unit N122. As such, there is a gap from the time when data is actually transmitted from the antenna N110. The time gap Tts is a fixed value preset depending on the constituent circuit and the system. The collision detection unit N150 determines start of transmission in consideration of the time gap Tts at step F210. This means that the collision detection unit N150 determines whether or not the time Tts has elapsed from the point of time when the in-transmission information N131 is ON to thereby determines a transmission start point.

When transmission has not started, the collision detection unit N150 returns to step F200, and repeats the same processing as that described above. When it is determined that transmission is being performed (F210: Yes), the collision detection unit N150 refers to the neighboring signal presence information N141 for the period Ts stored in the storage unit N190, and determines whether or not there is the neighboring signal presence information N141 that is ON within the period Ts (F215). If there is at least one piece of neighboring signal presence information N141 that is ON within the period Ts (F215: Yes), the collision detection unit N150 determines that there is collision and ends the processing (F245). When there is none (F215: No), the collision detection unit N150 waits until transmission is completed (F220: No). Even in that case, the collision detection unit N150 takes into consideration the time gap Tts. This means that the collision detection unit N150 determines whether or not the time Tts has elapsed from the point of time when the in-transmission information N131 is OFF, to thereby determine the transmission end point. The processing of steps F225, F230, F235, and F240 thereafter is the same as the processing of steps F125, F130, F135, and F140 of FIG. 2.

[Fourth Exemplary Embodiment]

Figure 8:
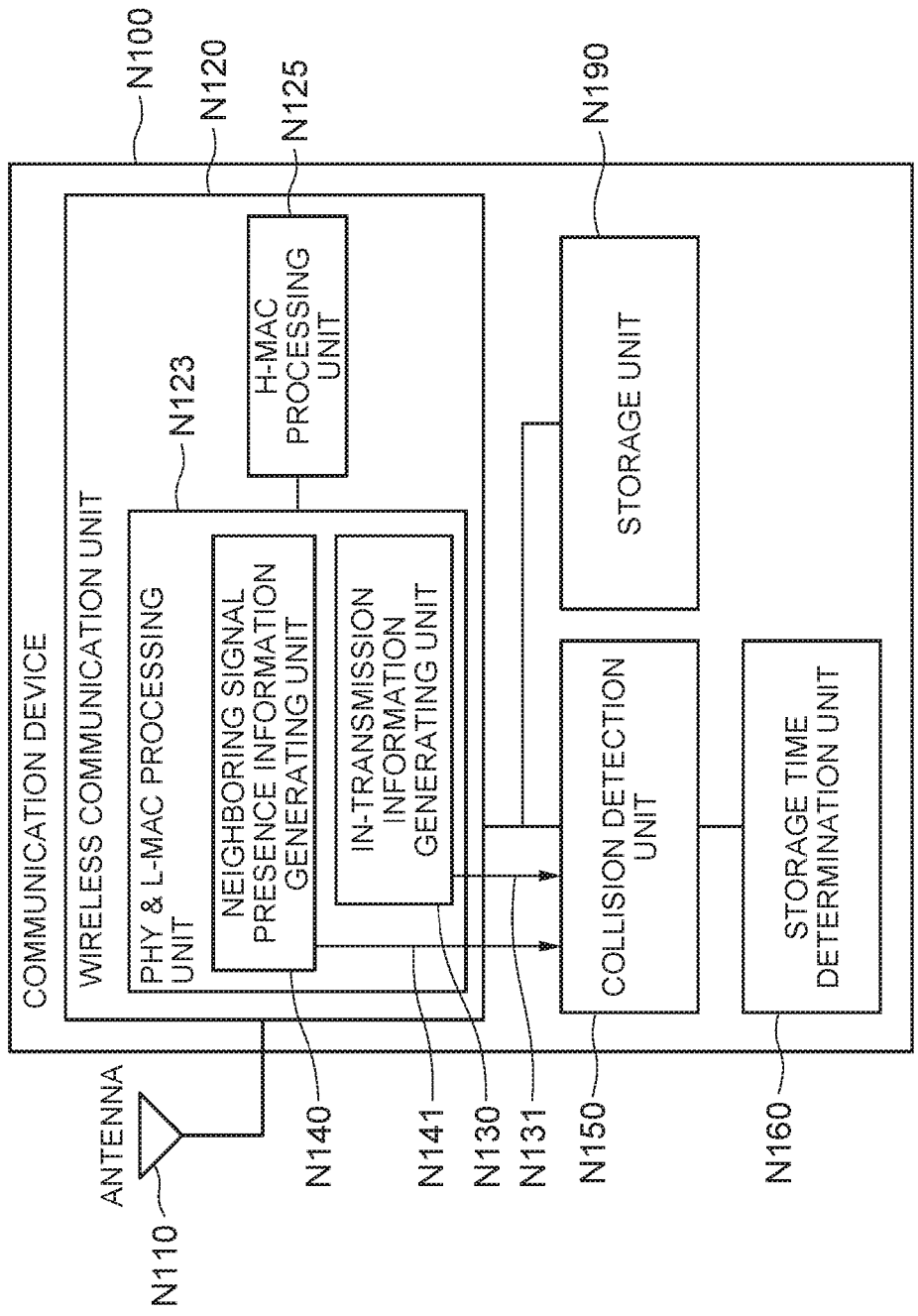
FIG. 8 is a block diagram of a communication device according to a fourth exemplary embodiment of the present invention.

Next, a fourth exemplary embodiment of the present invention will be described with reference to FIG. 8.

[Configuration]

The present embodiment specifies, in more detail, the internal configuration of the wireless communication unit N120 of the communication device N100 according to the second exemplary embodiment of the present invention illustrated in FIG. 4. The wireless communication unit N120 of the communication device N100 according to the present embodiment includes a PHY & L-MAC processing unit N123 and an H-MAC processing unit N125.

The PHY & L-MAC processing unit N123 is a part that performs processing (particularly, processing requiring accurate time control) of part of the physical layer (PHY layer) and the datalink layer (MAC layer) in the seven-story layers of OSI described in Non-Patent Document 2. Further, the H-MAC processing unit N125 is a part that performs the remaining processing, after eliminating the processing performed by the L-MAC processing unit N123, of the datalink layer (MAC) layer in the seven-story layers of OSI.

For example, the PHY & L-MAC processing unit N123 performs IFS (Interframe Space) processing, that is, processing requiring accurate time control in microsecond units, such as Acknowledge frame transmission processing and retransmission frame transmission processing, among the MAC processing clearly described in IEEE802.1 shown in Non-Patent Document 1, and the H-MAC processing unit N125 performs the remaining MAC processing.

In another example, hardware part in Linux Kernel Stack described in Non-Patent 3 corresponds to the PHY & L-MAC processing unit N123, and the Protocol Driver/Hardware driver/Interconnect driver corresponds to the H-MAC processing unit N125.

The PHY & L-MAC processing unit N123 has the in-transmission information generating unit N130 that generates the in-transmission information N131 representing that the signals are being transmitted from the antenna N110 and outputs it to the collision detection unit N150. Further, the PHY & L-MAC processing unit N123 has the neighboring signal presence information generating unit N140 that generates the neighboring signal presence information N141 that is information relating to a signal existing around, and outputs it to the collision detection unit N150 and stores it in the storage unit N190. In the present embodiment, the in-transmission information N131 is a finite counter that is counted up when data is transmitted from the MAC processing unit in the PHY & L-MAC processing unit N123 to the PHY processing unit. Further, the neighboring signal presence information N141 is a finite counter that is counted up when a signal equal to or higher than a threshold is received at the part that receives a signal from the antenna in the PHY processing unit of the PHY & L-MAC processing unit N123.

For example, the in-transmission information N131 and the neighboring signal presence information N141 correspond to tx_frame count and rx_clear count shown in Non-Patent Document 4. These are finite counters in which the values are counted when they are ON. For example, in the case of a 32-bit counter, counting is performed from 0 to 4294967295 which is followed by 0. In this example, while the in-transmission information N131 and the neighboring signal presence information N141 are finite counters, if they are simple ON and OFF signals, the present embodiment is similar to the first exemplary embodiment.

Figure 9:
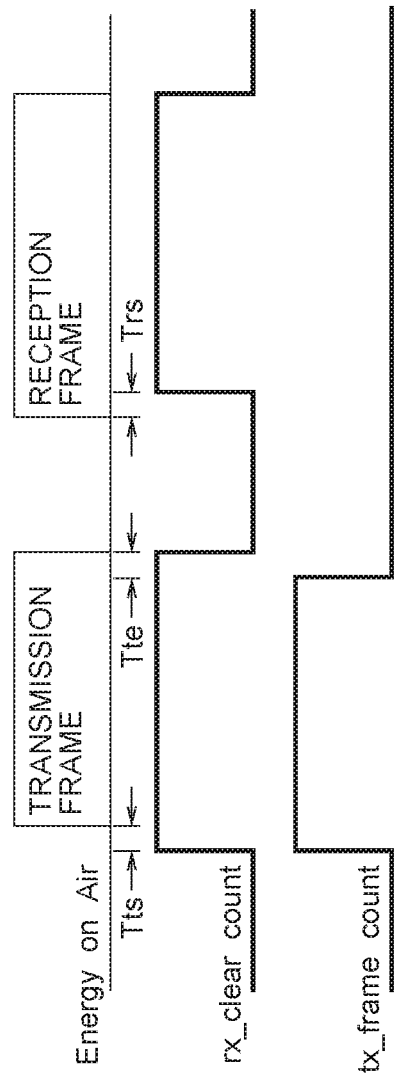
FIG. 9 illustrates a temporal relationship between states of finite counters used as in-transmission information and neighboring signal presence information and a transmission frame, in a communication device according to the fourth exemplary embodiment of the present invention.

FIG. 9 shows relationships between transmission and reception frames and tx_frame count and rx_clear count. As shown in FIG. 9, transmission of a transmission frame from the antenna N110 is started after the period Tts has elapsed from the point of time when counting of the tx_frame count started. Further, transmission of a transmission frame from the antenna N110 stops after the period Tte has elapsed from the point of time when counting of the tx_frame count is stopped. Further, the rx_clear count has started counting the period Tts before the point of time when the antenna N110 starts transmission of a transmission frame. FIG. 9 will be described in more detail below.

First, the first half of the FIG. 9 will be described. At the time of transmitting a frame, first, data is transmitted from the MAC processing unit to the PHY processing unit. At that time, the in-transmission information N131, that is, the tx_frame count, is ON. On the assumption that the neighboring signal presence information N141, that is, the rx_clear count, becomes ON when the tx_frame count is ON, the neighboring signal presence information N141 becomes ON at the same time. The timing of transmitting data to the PHY processing unit and the timing when the signal is actually transmitted on the space has a time gap due to device delay, DIFS, and the like. The time gap is assumed to be the period Tts. When transmission of data from the MAC processing unit to the PHY processing unit is completed, the tx_frame count becomes OFF. However, the PHY processing unit is still transmitting data continuously. Such a time gap is assumed to the period Tte. Here, as the rx_clear count becomes ON when there is a frame, that is, energy of a neighboring signal, on the space, it is still ON. When the actual transmission on the space is completed, the rx_clear count becomes OFF.

Next, the second half of FIG. 9 will be described. When a frame comes to the space, it takes time to detect the energy. Assuming that the time taken for detecting the energy is Trs, the rx_clear count becomes ON when Trs has elapsed after the frame comes to the space. The rx_clear count becomes OFF when receiving of the frame on the space is completed (when there is no energy).

[Operation]

In the present embodiment, the in-transmission information N131 and the neighboring signal presence information N141 are not simply ON and OFF flags but are finite counters. As such, mulfunction may occur due to overflow of the counter, if they are used as they are. Further, as illustrated in FIG. 9, time gaps are caused between transmission and reception of frames and the tx_frame count and the rx_clear count. Accordingly, in the present embodiment, it is necessary to perform processing while considering it.

Figure 10:
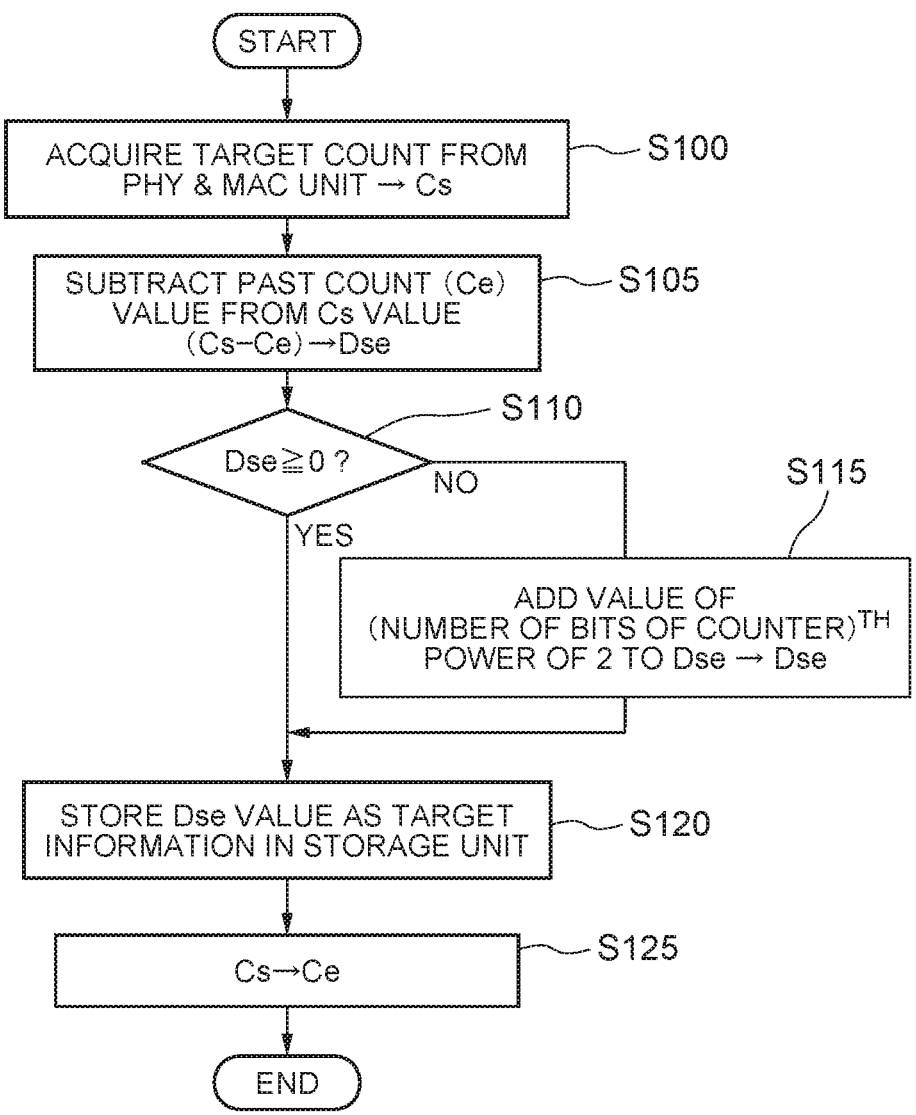
FIG. 10 is a flowchart of a process to convert a value of a finite counter into a value of zero or larger in a communication device according to the fourth exemplary embodiment of the present invention.

Therefore, in the present embodiment, when a finite counter is counted up, it is used by converting the value of the finite counter such that it becomes a value of zero or larger even if overflow of the counter occurs. FIG. 10 is a flowchart of a process to convert the value of a finite counter into a value of zero or larger. The process of FIG. 10 is executed when the in-transmission information generating unit N130 provides the in-transmission information N131 to the collision detection unit N150, and when the neighboring signal presence information generating unit N140 provides the neighboring signal presence information N141 to the collision detection unit N150 and stores it in the storage unit N190. Hereinafter, details of the process of FIG. 10 will be described.

Referring to FIG. 10, first, the in-transmission information generating unit N130 and the neighboring signal presence information generating unit N140 (hereinafter simply referred to as a generation unit) extracts a value of a target count (tx_frame count or rx_clear count) from the PHY & L-MAC processing unit N123, and stores it as Cs (S100). Next, the generation unit subtracts the value of the past count (Ce, to be described below, stored in the storage unit N190) from the value of Cs to obtain Dse (S105). Here, in the case where Ce has not been stored in the storage unit N190, Ce takes the value of Cs.

Next, the generation unit determines whether the value of Dse is zero or larger in order to determine whether the counter returns to zero, that is, whether or not overflow occurs (S110). When the value is not zero or larger (S110: No), in order to perform overflow processing, a countable total number is added to the value of Dse. For example, in the case of a counter for 32 bits, the $32^{nd}$ power of 2=4294967296 is added (S115). On the other hand, when the value is zero or larger (S110: Yes), the generation unit notifies the collision detection unit N150 of the value of Dse as target information (information obtained by converting the tx_frame count or the rx_clear count into a value of zero or higher), or stores it in the storage unit N190 (S120). Further, the generation unit stores Cs in the storage unit N190 as part target information Ce (S125). Here, the value of Cs is stored in the storage unit N190 as a separate value for each type of count, that is, for each of the in-transmission information N131 and the neighboring signal presence information N141.

As ON flags are counted up by the L-MAC processing, for example, by the method shown in the flow of FIG. 10, even in the case where the processing by the collision detection unit N150 is performed at a lower speed than that by the PHY & L-MAC processing unit, target information can be acquired. Further, compared with the case of storing all of the ON and OFF flags in the storage unit N190, it is possible to significantly reduce the information amount to be stored.

Figure 11:
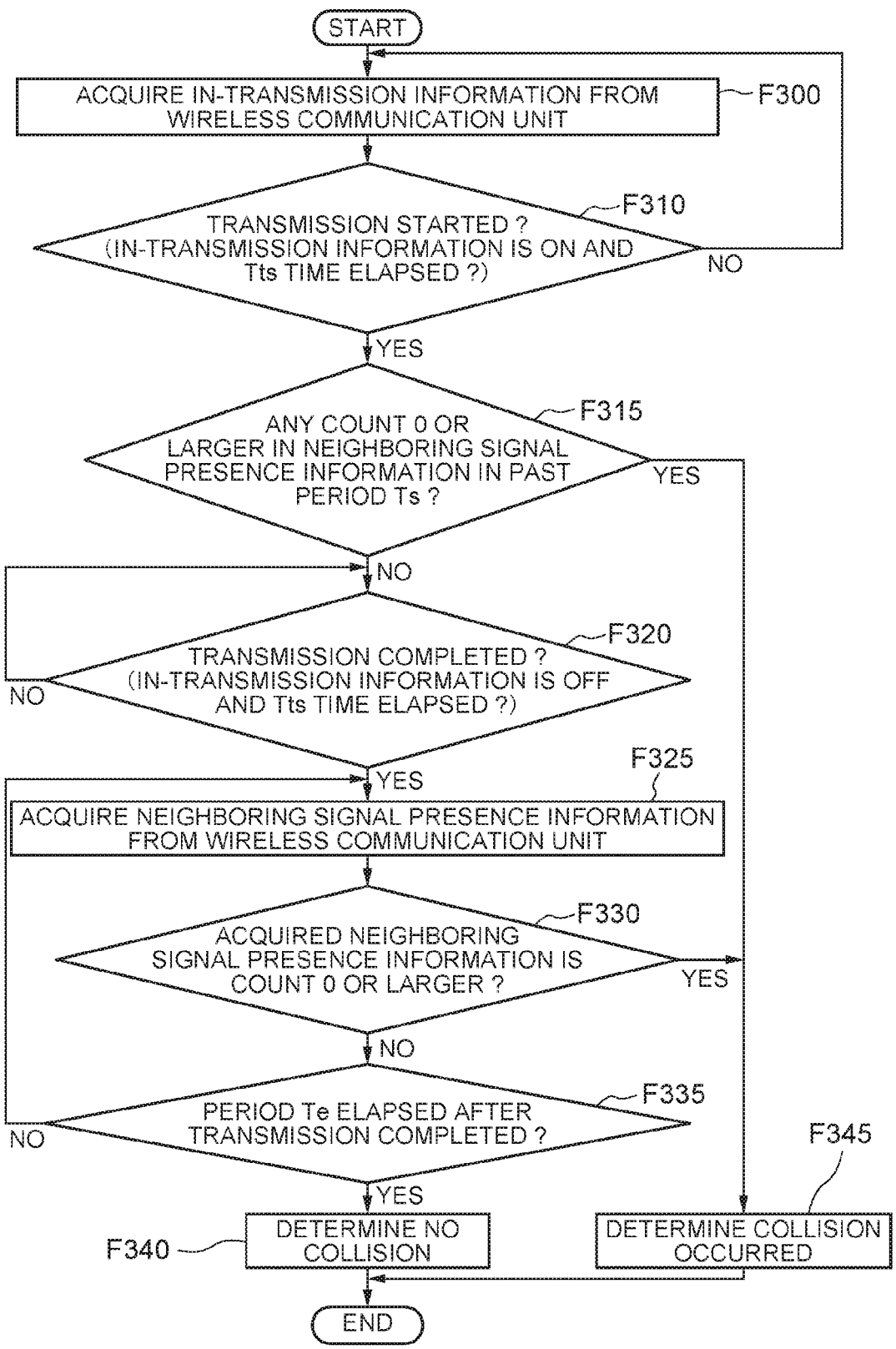
FIG. 11 is a flowchart showing an example of collision detecting operation of a communication device according to the fourth exemplary embodiment of the present invention.

Next, in the collision detection unit N150 of the present embodiment, collision detection is performed in consideration of a time gap between transmission and reception frames and the tx_frame count the rx_clear count. FIG. 11 illustrates a flow of the collision detection determination process at the time of signal transmission, in the communication device N100.

Referring to the flowchart of FIG. 11, the collision detection unit N150 acquires the in-transmission information N131 from the in-transmission information generating unit N130 of the wireless communication unit N120 (F300). Then, the collision detection unit N150 checks the acquired in-transmission information N131, and determines whether or not transmission has started in the wireless communication unit N120 in the communication device N100 (F310). In the present embodiment, the in-transmission information N131 is tx_frame count, and there is a time gap Tts from the time of actual transmission from the antenna N110. At step F310, the collision detection unit N150 determines to start transmission in consideration of the time gap Tts. This means that the collision detection unit N150 determines a transmission start point by determining whether or not the time gap Tts has elapsed from the point of time when the in-transmission information N131 becomes ON (the point of time when the count becomes zero or larger).

When transmission has not started, the collision detection unit N150 returns to step F300, and repeats the processing that is the same as the processing described above. If the collision detection unit N150 determines that transmission is being performed (F310: Yes), the collision detection unit N150 refers to the neighboring signal presence information N141 for the period Ts stored in the storage unit N190, and determines whether or not there is one having a count of zero or larger within the period Ts (F315). However, as illustrated in FIG. 9, in the period until the time Tts before the point of time when a transmission frame is transmitted from the antenna, the value of the rx_clear count is always zero or larger. As such, such a period is eliminated from the determination target. If there is at least one piece of in-transmission information in which the count value becomes zero or larger within the period Ts (F315: Yes), the collision detection unit N150 determines that there is collision, and ends the processing (F345). If there is none (F315: No), the collision detection unit N150 waits until transmission is completed (F320: No). Even in that case, the collision detection unit N150 takes into consideration the time gap Tte. This means that the collision detection unit N150 determines a transmission end point by determining whether or not the time Tte has elapsed from the point of time when the in-transmission information N131 becomes OFF.

When the transmission has been completed (F320: Yes), the collision detection unit N150 checks the neighboring signal presence information N141 for a certain period Te. This means that the collision detection unit N150 acquires the neighboring signal presence information N141 from the neighboring signal presence information generating unit N140 of the wireless communication unit N120 (F325), and determines whether or not the count of the acquired neighboring signal presence information N141 is zero or larger (F330). When the count is zero or larger (F330: Yes), the collision detection unit N150 determines that there is collision and ends the processing. When the count is not zero or larger (F330: No), the collision detection unit N150 determines whether or not the period Te has elapsed after the transmission has been completed (F335). When the period Te has not elapsed (F335: No), the collision detection unit N150 returns to F325, and returns to determination of the next neighboring signal presence information N141. When the period Te has elapsed, the collision detection unit N150 determines that there is no collision.

It should be noted that while, at F315, it is simply determined whether or not there is one in which the count is zero or larger, it is preferable to obtain an average of a plurality of count values in the period Ts, in consideration of fluctuation in the counts. This means that when there are n pieces of count values Cn in the period Ts, determination may be made in such a manner whether or not the value calculated by dividing the total sum $\Sigma Ci$ ($i=1\sim n$) of the n pieces of count values Cn by n is zero or larger. Similarly, the processing of determining whether or not the count is zero or larger at F330 may be performed by determining whether or not an average value of the count values at a plurality of points is zero or larger.

[Fifth Exemplary Embodiment]

Next, a fifth exemplary embodiment of the present invention will be described in detail.

Figure 12:
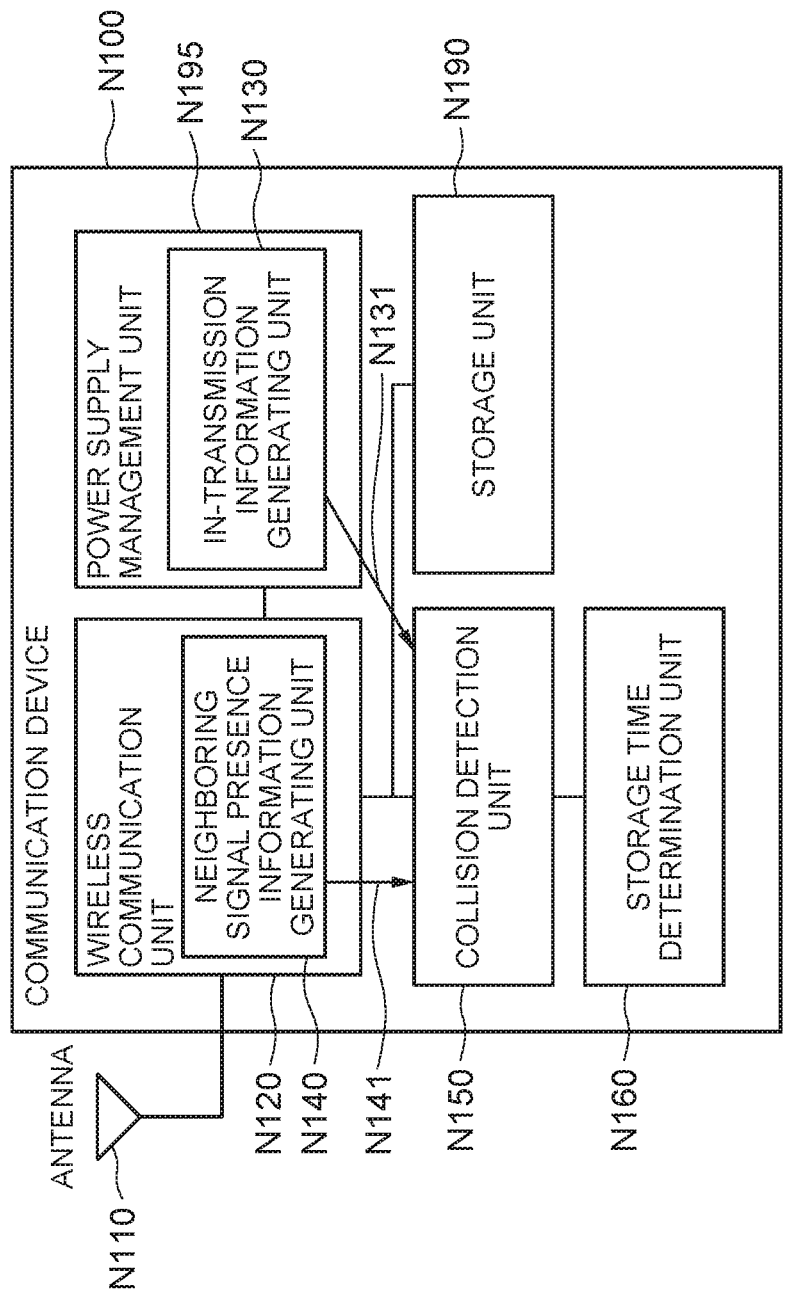
FIG. 12 is a block diagram of a communication device according to a fifth exemplary embodiment of the present invention.

Referring to FIG. 12, a communication device N100 according to the present embodiment includes a wireless communication unit N120, a collision detection unit N150, a storage time determination unit N160, a storage unit N190, and a power supply management unit N195. Among them, the wireless communication unit N120, the collision detection unit N150, the storage time determination unit N160, and the storage unit N190 have the same functions as those of the wireless communication unit N120, the collision detection unit N150, the storage time determination unit N160, and the storage unit N190 in the second exemplary of the present invention illustrated in FIG. 4. However, the wireless communication unit N120 has the neighboring signal presence information generating unit N140 but does not have the in-transmission information generating unit N130.

The power supply management unit N195 has the in-transmission information generating unit N130 that acquires electric power (or electric current) information used by the wireless communication unit N120, and outputs it as the in-transmission information N131 to the collision detection unit N150. In the wireless communication unit N120, power consumption during transmission is larger, compared with the time of reception or stand-by. As such, the electric power (or electric current) information used by the wireless communication unit N120 can be used as in-transmission information. As a method of acquiring electric power of the wireless communication unit N120 by the in-transmission information generating unit N130, any existing method may be used. For example, an ammeter or an electric current sensor may be directly inserted in a circuit (a part involved in signal transmission such as a wireless chip or a wireless module) of the wireless communication unit N120, or a coil or a Hall element may be used to perform measurement without interrupting the circuit of the wireless communication unit N120 like a clamp wattmeter or a clamp power sensor.

Further, as a method of acquiring electric power of the wireless communication unit N120 by the in-transmission information generating unit N130, it is possible to measure electric current or electric power flowing on the antenna side of the wireless communication unit N120, that is, electric current or electric power information flowing in the transmission antenna itself, or electric current or electric power information that can be acquired from the periphery of the transmission antenna and the connecting cable thereof.

[Operation]

Operation of the present embodiment is basically similar to that of the second exemplary embodiment illustrated in FIG. 4. However, in the present embodiment, the in-transmission information generating unit N130 generates electric power (electric current) information to be used by the wireless communication unit N120, as the in-transmission information N131.

[Sixth Exemplary Embodiment]

Figure 13:
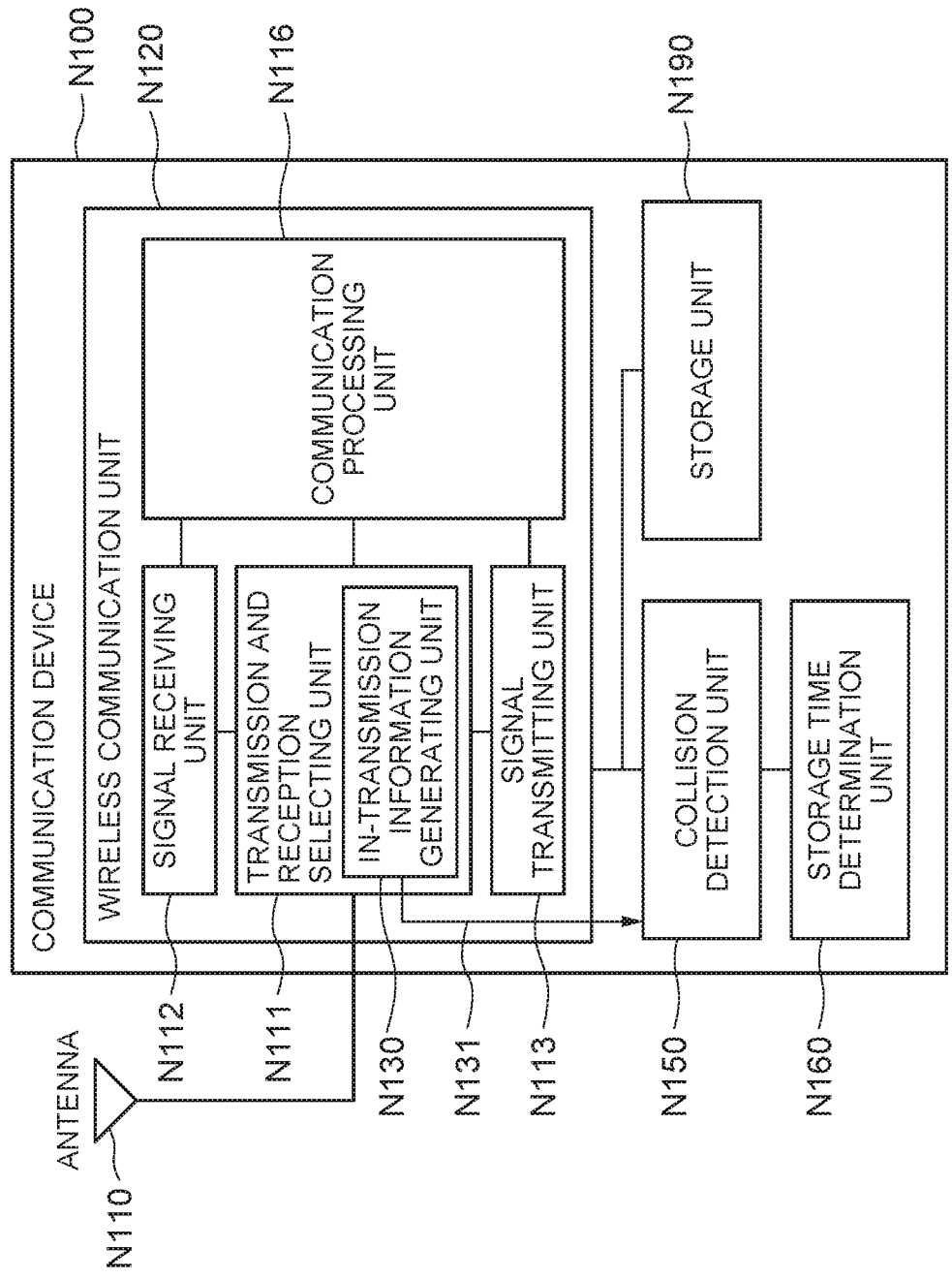
FIG. 13 is a block diagram of a communication device according to a sixth exemplary embodiment of the present invention.

The present embodiment specifies, in more detail, the internal configuration of the wireless communication unit N120 of the communication device N100 according to the second exemplary embodiment of the present invention illustrated in FIG. 4. Referring to FIG. 13, the wireless communication unit N120 of the communication device N100 according to the present embodiment includes a transmission and reception selecting unit N111, a signal receiving unit N112, a signal transmitting unit N113, and a communication processing unit N116.

The transmission and reception selecting unit N111 is a circuit that selects transmission or reception. For example, it is a switch that connects to the signal transmitting unit N113 when a signal is transmitted from the antenna N110, and connects to the signal receiving unit N112 when a signal is received from the antenna N110, for example. Regarding such a selecting circuit, an existing technology may be used. For example, a transmission and reception selecting circuit as shown in Patent Document 3 has been known. In the present embodiment, the in-transmission information generating unit N130 exists in the transmission and reception selecting unit N111. The in-transmission information generating unit N130 generates a selecting state of the transmission and reception selecting unit N111 as the in-transmission information N131. Specifically, the in-transmission information generating unit N130 generates the in-transmission information N131 in which a state where the transmission and reception selecting unit N111 is connected with the signal transmitting unit N113 is an in-transmission information ON state, and a state where the transmission and reception selecting unit N111 is not connected with the signal transmitting unit N113 is an in-transmission information OFF state, and outputs it to the collision detection unit N150.

The signal receiving unit N112 performs processing to extract data from a received signal, such as analog-digital conversion and demodulation processing of a received signal. The neighboring signal presence information generating unit N140 may exists in the signal receiving unit N112, for example.

The signal transmitting unit N113 performs processing to convert data into a transmission signal, such as analog-digital conversion and demodulation processing of a signal to be transmitted.

The communication processing unit N116 performs processing on communication protocols conforming to IEEE802.11 shown in Non-Patent Document 1, for example.

[Operation]

Operation of the present embodiment is basically similar to that of the second exemplary embodiment illustrated in FIG. 4. However, in the present embodiment, the in-transmission information generating unit N130 generates the in-transmission information N131 in accordance with a selecting state of the transmission and reception selecting unit N111.

[Seventh Exemplary Embodiment]

Next, a seventh exemplary embodiment of the present invention will be described in detail.

[Configuration]

Figure 14:
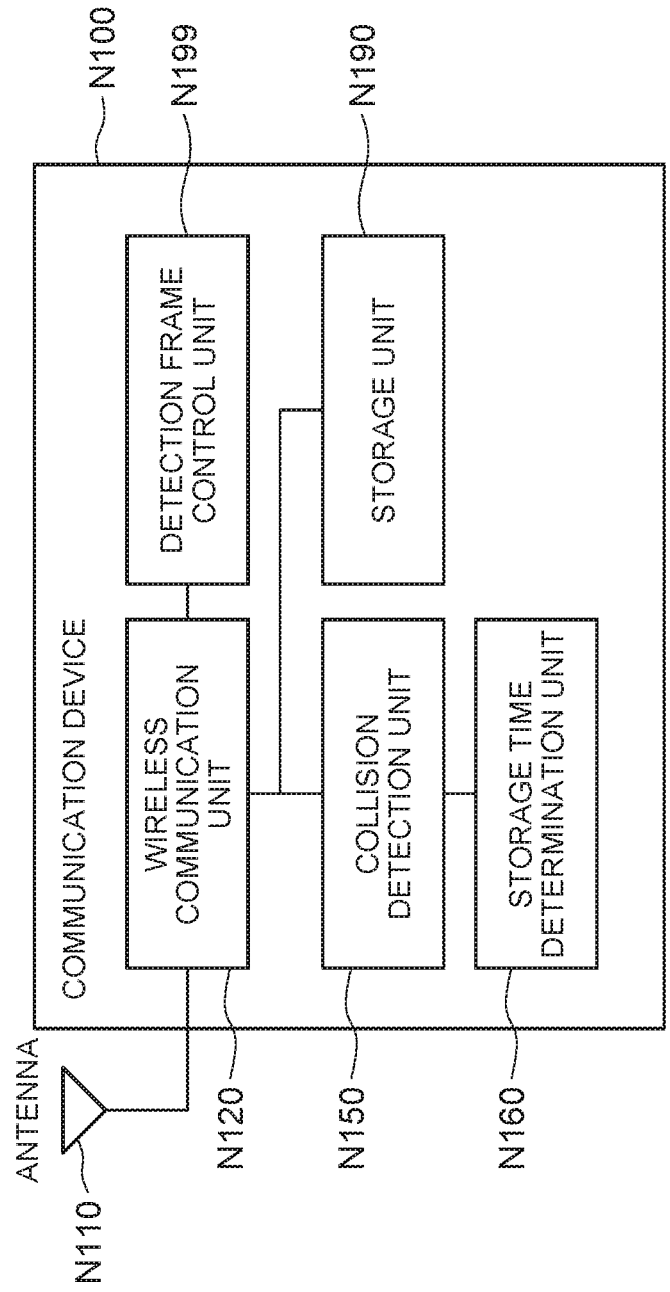
FIG. 14 is a block diagram of a communication device according to a seventh exemplary embodiment of the present invention.

Referring to FIG. 14, a communication device N100 according to the seventh exemplary embodiment of the present invention includes a wireless communication unit N120, a collision detection unit N150, a storage unit N190, and a storage time determination unit N160, having the same functions as those in the communication device N100 according to the second exemplary embodiment of the present invention illustrated in FIG. 4, and also includes a detection frame control unit N199.

The detection frame control unit N199 has a function of transmitting data to the wireless communication unit N120 so as to transmit a test frame (detection frame) for detecting frame collision.

[Operation]

The detection frame control unit N199 transmits data to the wireless communication unit N120 so as to transmit a test frame by itself to detect collision. A test frame to be transmitted may be a broadcast frame, and it is preferable to take a shorter transmission time. As a method of reducing the transmission time, a method of increasing the transmission rate or a method of decreasing the amount of data (reducing the data length) may be used.

Further, the detection frame control unit N199 increases or decreases transmission of detection frames according to the frequency of detecting collision. The detection frame control unit N199 controls to reduce transmission of detection frames when the amount of data transmitted by the own communication device N100 is larger, for example. Further, the detection frame control unit N199 refers to the past neighboring signal presence information stored in the storage unit N190, and when there are a large number of signals around it, performs control to reduce transmission of detection frames.

Operation of the wireless communication unit N120, the collision detection unit N150, the storage unit N190, and the storage time determination unit N160, other than the operation of the detection frame control unit N199, is similar to that of the second exemplary embodiment illustrated in FIG. 4.

Further, the communication device N100 of the present embodiment may have a function of calculating a collision rate according to the number of collided frames among the transmitted detection frames, and based on the collision rate, adjusting transmission parameters (carrier sense sensitivity, back-off time, transmission rate, and the like). It should be noted that the function of adjusting such transmission parameters may be provided not only to the communication device of the present embodiment but also to the communication devices according to all exemplary embodiments of the present invention such as the first to sixth exemplary embodiments and an eighth exemplary embodiment described below.

[Eighth Exemplary Embodiment]

Next, an eighth exemplary embodiment of the present invention will be described in detail.

[Configuration]

Figure 15:
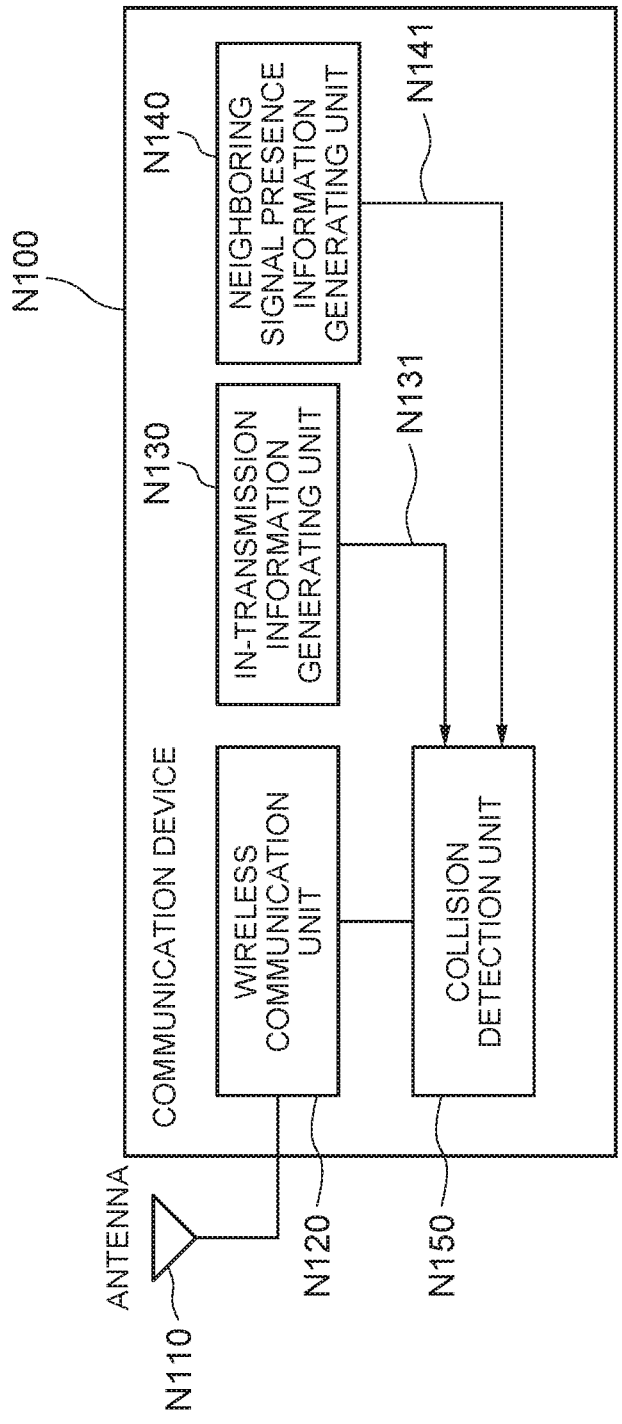
FIG. 15 is a block diagram of a communication device according to an eighth exemplary embodiment of the present invention.

Referring to FIG. 15, a communication device N100 according to the eighth exemplary embodiment of the present invention includes a wireless communication unit N120, an in-transmission information generating unit N130, a neighboring presence information generating unit N140, and a collision detection unit N150.

The wireless communication unit N120 has a function of receiving a wireless frame via the antenna N110.

The in-transmission information generating unit N130 has a function of generating the in-transmission information N131 showing whether or not a wireless frame is being transmitted from the antenna N110 by the communication device N100.

The neighboring presence information generating unit N140 has a function of generating the neighboring signal presence information N141 showing whether or not there is a signal of a predetermined level or higher on a wireless channel that is the same as the channel through which a wireless frame is transmitted.

The collision detection unit N150 has a function of determining whether or not a transmitted wireless frame collided with another wireless frame. More specifically, the collision detection unit N150 has a function of determining a transmission end point of a wireless frame transmitted from the wireless communication unit N120, based on the in-transmission information N131, a function of determining whether or not there is a signal of a predetermined level or higher on the wireless channel through which the wireless frame is transmitted within a period until a first time elapses from the determined transmission end point, based on the neighboring signal presence information N141, and a function of determining whether or not the transmitted wireless frame collided with another wireless frame, based on the determination made based on the neighboring signal presence information N141.

[Operation]

Next, operation of the communication device N100 according to the present embodiment will be described.

The wireless communication unit N120 transmits a wireless frame to the space around it through the antenna N110. At that time, the in-transmission information generating unit N130 generates the in-transmission information N130 representing whether or not a wireless frame is being transmitted from the antenna N110, and outputs it to the collision detection unit N150. Further, the neighboring signal presence information generating unit N140 generates the neighboring signal presence information N141 representing whether or not there is a signal of a predetermined level or higher on a wireless channel that is the same as the channel of the wireless frame is transmitted, and outputs it to the collision detection unit N150.

The collision detection unit N150 determines a transmission end point of the wireless frame transmitted from the wireless communication unit N120, based on the in-transmission information N131. Further, the collision detection unit N150 determines whether or not there is a signal of a predetermined level or higher on the wireless channel through which the wireless frame is transmitted within a period until a first time elapses from the determined transmission end point, based on the neighboring signal presence information N141. Then, the collision detection unit N150 determines whether or not the transmitted wireless frame collided with another wireless frame, based on the determination made based on the neighboring signal presence information N140. This means that the collision detection unit N150 determines that the transmitted wireless frame collided with another wireless frame if there is a signal of a predetermined level or higher on the wireless channel through which the wireless frame is transmitted within the period until the first time elapses from the determined transmission end point.

In this way, according to the present embodiment, it is possible to simplify the process of detecting collision of wireless frames after communications have started. This is because the process of determining whether or not there is a signal of a predetermined level or higher within a period until the first time elapses from the point when the own communication device N100 ends transmission of the wireless frame is simpler, compared with the process of converting sample data of sensed spatial radio signals into time-series sample data that is data plotted in a time-series manner, and based on the time-series sample data, determining packet collision due to interference between a packet transmitted from the own communication device and other communications.

While the present invention has been described with reference to the exemplary embodiments described above, the present invention is not limited to the above-described embodiments. The form and details of the present invention can be changed within the scope of the present invention in various manners that can be understood by those skilled in the art.

It should be noted that the present invention is based upon and claims the benefit of priority from Japanese patent application No. 2014-166550, filed on Aug. 19, 2014, the disclosure of which is incorporated herein in its entirety by reference.

Industrial Applicability

The present invention is applicable to detection of frame collision in wireless LAN.

The whole or part of the exemplary embodiments disclosed above can be described as, but not limited to, the following supplementary notes.

[Supplementary Note 1]

A communication device having a wireless communication unit that transmits and receives a wireless frame via an antenna, comprising:

an in-transmission information generating unit that generates in-transmission information representing whether or not the wireless frame is being transmitted from the antenna;

a neighboring signal presence information generating unit that generates neighboring signal presence information representing whether or not a signal of a predetermined level or higher is present on a wireless channel that is same as a wireless channel of the wireless frame; and a collision detection unit that determines a transmission end point of the wireless frame transmitted from the wireless communication unit based on the in-transmission information, determines whether or not there is a signal of the predetermined level or higher on the wireless channel through which the wireless frame is transmitted within a period from the determined transmission end point until a first time elapses, based on the neighboring signal presence information, and determines whether or not the transmitted wireless frame collided with another wireless frame, based on the determination made based on the neighboring signal presence information.

[Supplementary Note 2]

The communication device according to supplementary note 1, further comprising a storage unit that stores the neighboring signal presence information generated in a past certain period of time, wherein the collision detection unit determines a transmission start point of the wireless frame transmitted from the wireless communication unit based on the in-transmission information, determines whether or not there is a signal of a predetermined level or higher on the wireless channel through which the wireless frame is transmitted, within a period from a point a second time before the determined transmission start point until the determined transmission start point, based on the neighboring signal presence information stored in the storage unit, and determines whether or not the transmitted wireless frame collided with another wireless frame, based on the determination made based on the neighboring signal presence information stored in the storage unit.

[Supplementary Note 3]

The communication device according to supplementary note 1 or 2, wherein the predetermined level is a level smaller than a threshold of carrier sense performed by the wireless communication unit.

[Supplementary Note 4]

The communication device according to supplementary note 1, wherein the wireless communication unit includes a PHY processing unit and a MAC processing unit, and the in-transmission information generating unit generates information representing whether or not data is transmitted from the MAC processing unit to the PHY processing unit, as the in-transmission information.

[Supplementary Note 5]

The communication device according to supplementary note 4, wherein the information representing whether or not data is transmitted from the MAC processing unit to the PHY processing unit is a finite counter that is counted up when data is transmitted.

[Supplementary Note 6]

The communication device according to supplementary note 4 or 5, wherein the collision detection unit determines the transmission end point of the wireless frame transmitted from the wireless communication unit, based on a time required from when the data is transmitted from the MAC processing unit to the PHY processing unit until the data is transmitted from the antenna, and on the in-transmission information.

[Supplementary Note 7]

The communication device according to supplementary note 1, wherein the wireless communication unit includes a PHY processing unit and a MAC processing unit, and the neighboring signal presence information generating unit generates, as the neighboring signal presence information, information representing whether or not a signal equal to or larger than a threshold is received at a part where a signal from the antenna is received in the PHY processing unit.

[Supplementary Note 8]

The communication device according to supplementary note 7, wherein the information representing whether or not a signal equal to or larger than the threshold is received at the part where a signal from the antenna is received in the PHY processing unit is a finite counter that is counted up when a signal equal to or larger than the threshold is received.

[Supplementary Note 9]

The communication device according to supplementary note 1, wherein the in-transmission information generating unit generates, as the in-transmission information, information representing electric current consumption or electric power consumption of a part involved in signal transmission of the wireless communication unit.

[Supplementary Note 10]

The communication device according to supplementary note 1, wherein the in-transmission information generating unit generates, as the in-transmission information, information representing electric current or electric power flowing through the antenna when the wireless frame is being transmitted from the antenna.

[Supplementary Note 11]

The communication device according to supplementary note 1, wherein the wireless communication unit includes a transmission and reception selecting unit that selects transmission or reception, and the in-transmission information generating unit generates a selecting state of the transmission and reception selecting unit as the in-transmission information.

[Supplementary Note 12]

The communication device according to supplementary note 1, further comprising a detection frame control unit that controls the wireless communication unit so as to transmit a test frame for detecting frame collision.

[Supplementary Note 13]

The communication device according to any of supplementary notes 1 to 12, wherein the communication device has a function of adjusting a transmission parameter (carrier sense sensitivity, back-off time, transmission rate, or the like).

[Supplementary Note 14]

A collision detection method performed by a communication device having a wireless communication unit that transmits and receives a wireless frame via an antenna, the method comprising:

generating in-transmission information representing whether or not the wireless frame is being transmitted from the antenna;

generating neighboring signal presence information representing whether or not a signal of a predetermined level or higher is present on a wireless channel that is same as a wireless channel of the wireless frame; and determining a transmission end point of the wireless frame transmitted from the wireless communication unit based on the in-transmission information, determining whether or not there is a signal of the predetermined level or higher on the wireless channel through which the wireless frame is transmitted within a period from the determined transmission end point until a first time elapses, based on the neighboring signal presence information, and determining whether or not the transmitted wireless frame collided with another wireless frame, based on the determination made based on the neighboring signal presence information.

[Supplementary Note 15]

The collision detection method according to supplementary note 14, wherein the communication device includes a storage unit that stores the neighboring signal presence information generated in a past certain period of time, and the method further comprises determining a transmission start point of the wireless frame transmitted from the wireless communication unit based on the in-transmission information, determining whether or not there is a signal of a predetermined level or higher on the wireless channel through which the wireless frame is transmitted, within a period from a point a second time before the determined transmission start point until the determined transmission start point, based on the neighboring signal presence information stored in the storage unit, and determining whether or not the transmitted wireless frame collided with another wireless frame, based on the determination made based on the neighboring signal presence information stored in the storage unit.

[Supplementary Note 16]

The collision detection method according to supplementary note 14 or 15, wherein the predetermined level is a level smaller than a threshold of carrier sense performed by the wireless communication unit.

[Supplementary Note 17]

The collision detection method according to supplementary note 14, wherein the wireless communication unit includes a PHY processing unit and a MAC processing unit, and the method further comprises generating information representing whether or not data is transmitted from the MAC processing unit to the PHY processing unit, as the in-transmission information.

[Supplementary Note 18]

The collision detection method according to supplementary note 17, wherein the information representing whether or not data is transmitted from the MAC processing unit to the PHY processing unit is a finite counter that is counted up when data is transmitted.

[Supplementary Note 19]

The collision detection method according to supplementary note 17 or 18, wherein the determining the transmission end point of the wireless frame includes determining the transmission end point of the wireless frame transmitted from the wireless communication unit, based on a time required from when the data is transmitted from the MAC processing unit to the PHY processing unit until the data is transmitted from the antenna, and on the in-transmission information.

[Supplementary Note 20]

The collision detection method according to supplementary note 14, wherein the wireless communication unit includes a PHY processing unit and a MAC processing unit, and the method further comprises generating, as the neighboring signal presence information, information representing whether or not a signal equal to or larger than a threshold is received at a part where a signal from the antenna is received in the PHY processing unit.

[Supplementary Note 21]

The collision detection method according to supplementary note 20, wherein the information representing whether or not a signal equal to or larger than the threshold is received at the part where a signal from the antenna is received in the PHY processing unit is a finite counter that is counted up when a signal equal to or larger than the threshold is received.

[Supplementary Note 22]

The collision detection method according to supplementary note 14, further comprising generating, as the in-transmission information, information representing electric current consumption or electric power consumption of a part involved in signal transmission of the wireless communication unit.

[Supplementary Note 23]

The collision detection method according to supplementary note 14, further comprising generating, as the in-transmission information, information representing electric current or electric power flowing through the antenna when the wireless frame is being transmitted from the antenna.

[Supplementary Note 24]

The collision detection method according to supplementary note 14, wherein the wireless communication unit includes a transmission and reception selecting unit that selects transmission or reception, and the method further comprises generating a selecting state of the transmission and reception selecting unit as the in-transmission information.

[Supplementary Note 25]

The collision detection method according to supplementary note 13, further comprising transmitting a test frame for detecting frame collision from the wireless communication unit.

[Supplementary Note 26]

The collision detection method according to any of supplementary notes 14 to 25, further comprising a step of adjusting a transmission parameter (carrier sense sensitivity, back-off time, transmission rate, or the like).

[Supplementary Note 27]

A program for causing a computer, having a wireless communication unit that transmits and receives a wireless frame via an antenna, to function as:

an in-transmission information generating unit that generates in-transmission information representing whether or not the wireless frame is being transmitted from the antenna;

a neighboring signal presence information generating unit that generates neighboring signal presence information representing whether or not a signal of a predetermined level or higher is present on a wireless channel that is same as a wireless channel of the wireless frame; and a collision detection unit that determines a transmission end point of the wireless frame transmitted from the wireless communication unit based on the in-transmission information, determines whether or not there is a signal of the predetermined level or higher on the wireless channel through which the wireless frame is transmitted within a period from the determined transmission end point until a first time elapses, based on the neighboring signal presence information, and determines whether or not the transmitted wireless frame collided with another wireless frame, based on the determination made based on the neighboring signal presence information.

REFERENCE NUMERALS

N100 communication device
N110 antenna
N120 wireless communication unit
N130 in-transmission information generating unit
N140 neighboring signal presence information generating unit
N150 collision detection unit
N190 storage unit

The invention claimed is:

1. A communication device having a wireless communication unit configured to transmit and receive a wireless frame via an antenna, comprising:

a first generator configured to generate in-transmission information representing whether or not the wireless frame is being transmitted from the antenna;

a second generator configured to generate neighboring signal presence information representing whether or not a signal of a predetermined level or higher is present on a wireless channel that is same as a wireless channel of the wireless frame;

a detector configured to determine a transmission end point of the wireless frame transmitted from the wireless communication unit based on the in-transmission information, determine whether or not there is a signal of the predetermined level or higher on the wireless channel through which the wireless frame is transmitted within a period from the determined transmission end point until a first time elapses, based on the neighboring signal presence information, and determine whether or not the transmitted wireless frame collided with another wireless frame, based on the determination made based on the neighboring signal presence information; and a storage unit configured to store the neighboring signal presence information generated in a past certain period of time, wherein the detector determines a transmission start point of the wireless frame transmitted from the wireless communication unit based on the in-transmission information, determines whether or not there is a signal of the predetermined level or higher on the wireless channel through which the wireless frame is transmitted, within a period from a time before the determined transmission start point and the determined transmission start point, based on the neighboring signal presence information stored in the storage unit, and determines whether or not the transmitted wireless frame collided with another wireless frame, based on the determination made based on the neighboring signal presence information stored in the storage unit.

2. The communication device according to claim 1, wherein
the predetermined level is a level smaller than a threshold of carrier sense performed by the wireless communication unit.

3. The communication device according to claim 1, wherein
the wireless communication unit includes a physical layer (PHY) processing unit and a media access control (MAC) processing unit, and
the first generator generates information representing whether or not data is transmitted from the MAC processing unit to the PHY processing unit, as the in-transmission information.

4. The communication device according to claim 3, wherein
the information representing whether or not data is transmitted from the MAC processing unit to the PHY processing unit is a finite counter that is counted up when data is transmitted.

5. The communication device according to claim 3, wherein
the detector determines the transmission end point of the wireless frame transmitted from the wireless communication unit, based on a time required from when the data is transmitted from the MAC processing unit to the PHY processing unit until the data is transmitted from the antenna, and on the in-transmission information.

6. The communication device according to claim 1, further comprising
a controller configured to control the wireless communication unit so as to transmit a test frame for detecting frame collision.

7. The communication device according to claim 1, wherein the communication device has a function of adjusting a transmission parameter.

8. A communication device having a wireless communication unit configured to transmit and receive a wireless frame via an antenna, comprising:
a first generator configured to generate in-transmission information representing whether or not the wireless frame is being transmitted from the antenna;
a second generator configured to generate neighboring signal presence information representing whether or not a signal of a predetermined level or higher is present on a wireless channel that is same as a wireless channel of the wireless frame; and
a detector configured to determine a transmission end point of the wireless frame transmitted from the wireless communication unit based on the in-transmission information, determine whether or not there is a signal of the predetermined level or higher on the wireless channel through which the wireless frame is transmitted within a period from the determined transmission end point until a first time elapses, based on the neighboring signal presence information, and determine whether or not the transmitted wireless frame collided with another wireless frame, based on the determination made based on the neighboring signal presence information,
wherein the wireless communication unit further includes a PHY processing unit and a MAC processing unit,
the second generator generates, as the neighboring signal presence information, information representing whether or not a signal equal to or larger than a threshold is received at a part where a signal from the antenna is received in the PHY processing unit, and
the information representing whether or not a signal equal to or larger than the threshold is received at the part where a signal from the antenna is received in the PHY processing unit is a finite counter that is counted up when a signal equal to or larger than the threshold is received.

9. A communication device having a wireless communication unit configured to transmit and receive a wireless frame via an antenna, comprising:
a first generator configured to generate in-transmission information representing whether or not the wireless frame is being transmitted from the antenna;
a second generator configured to generate neighboring signal presence information representing whether or not a signal of a predetermined level or higher is present on a wireless channel that is same as a wireless channel of the wireless frame; and
a detector configured to determine a transmission end point of the wireless frame transmitted from the wireless communication unit based on the in-transmission information, determine whether or not there is a signal of the predetermined level or higher on the wireless channel through which the wireless frame is transmitted within a period from the determined transmission end point until a first time elapses, based on the neighboring signal)presence information, and determine whether or not the transmitted wireless frame collided with another wireless frame, based on the determination made based on the neighboring signal presence information,
wherein the first generator generates, as the in-transmission information, information representing electric current consumption or electric power consumption of a part involved in signal transmission of the wireless communication unit.

10. A communication device having a wireless communication unit configured to transmit and receive a wireless frame via an antenna, comprising:
a first generator configured to generate in-transmission information representing whether or not the wireless frame is being transmitted from the antenna;
a second generator configured to generate neighboring signal presence information representing whether or not a signal of a predetermined level or higher is present on a wireless channel that is same as a wireless channel of the wireless frame; and
a detector configured to determine a transmission end point of the wireless frame transmitted from the wireless communication unit based on the in-transmission information, determine whether or not there is a signal of the predetermined level. or higher on the wireless channel through which the wireless frame is transmitted within a period from the determined transmission end point until a first time elapses, based on the neighboring signal presence information, and determine whether or not the transmitted wireless frame collided with another wireless frame, based Oil the determination made based on the neighboring signal presence information, wherein the first generator generates, as the in-transmission information, information representing electric current or electric power flowing through the antenna when the wireless frame is being transmitted from the antenna.

11. A communication device having a wireless communication unit configured to transmit and receive a wireless frame via an antenna, comprising:
a first generator configured to generate in-transmission information representing whether or not the wireless frame is being transmitted from the antenna;
a second generator configured to generate neighboring signal presence information representing whether or not a signal of a predetermined level or higher is present on a wireless channel that is same as a wireless channel of the wireless frame; and
a detector configured to determine a transmission end point of the wireless frame transmitted from the wireless communication unit based on the in-transmission information, determine whether or not there is a signal of the predetermined level or higher on the wireless channel through which the wireless frame is transmitted within a period from the determined transmission end point until a first time elapses, based on the neighboring signal presence information, and determine whether or not the transmitted wireless frame collided with another wireless frame, based on the determination made based on the neighboring signal presence information,
wherein the wireless communication unit includes a selector configured to select transmission or reception, and the first generator generates a selecting state of the selector as the in-transmission information.

12. A collision detection method performed by a communication device having a wireless communication unit configured to transmit and receive a wireless frame via an antenna, the method comprising:
generating in-transmission information representing whether or not the wireless frame is being transmitted from the antenna;
generating neighboring signal presence information representing whether or not a signal of a predetermined level or higher is present on a wireless channel that is same as a wireless channel of the wireless frame;
determining a transmission end point of the wireless frame transmitted from the wireless communication unit based on the in-transmission information, determining whether or not there is a signal of the predetermined level or higher on the wireless channel through which the wireless frame is transmitted within a period from the determined transmission end point until a first time elapses, based on the neighboring signal presence information, and determining whether or not the transmitted wireless frame collided with another wireless frame, based on the determination made based on the neighboring signal presence information;
storing the neighboring signal presence information generated in a past certain period of time in a storage unit; and
determining a transmission start point of the wireless frame transmitted from the wireless communication unit based on the in-transmission information, determining whether or not there is a signal of the predetermined level or higher on the wireless channel through which the wireless frame is transmitted, within a period from a time before the determined transmission start point and the determined transmission start point, based on the neighboring signal presence information stored in the storage unit, and determining whether or not the transmitted wireless frame collided with anotherwireless frame, based on the determination made based on the neighboring signal presence information stored in the storage unit.

13. The collision detection method according to claim 12, wherein
the predetermined level is a level smaller than a threshold of carrier sense performed by the wireless communication unit.

14. The collision detection method according to claim 12, wherein
the wireless communication unit includes a PHY processing unit and a MAC processing unit, and
the method further comprises generating information representing whether or not data is transmitted from the MAC processing unit to the PHY processing unit, as the in-transmission information.

15. The collision detection method according to claim 14, wherein
the information representing whether or not data is transmitted from the MAC processing unit to the PHY processing unit is a finite counter that is counted up when data is transmitted.

16. The collision detection method according to claim 14, wherein
the determining the transmission end point of the wireless frame includes determining the transmission end point of the wireless frame transmitted from the wireless communication unit, based on a time required from when the data is transmitted from the MAC processing unit to the PHY processing unit until the data is transmitted from the antenna, and on the in-transmission information.

17. The collision detection method according to claim 12, wherein
the wireless communication unit includes a PHY processing unit and a MAC processing unit, and
the method further comprises generating, as the neighboring signal presence information, information representing whether or not a signal equal to or larger than a threshold is received at a part where a signal from the antenna is received in the PHY processing unit.

* * * * *

UNITED STATES PATENT AND TRADEMARK OFFICE
CERTIFICATE OF CORRECTION

PATENT NO. : 10,356,844 B2
APPLICATION NO. : 15/503140
DATED : July 16, 2019
INVENTOR(S) : Akira Matsumoto, Peng Shao and Yuki Baba Page 1 of 1

It is certified that error appears in the above-identified patent and that said Letters Patent is hereby corrected as shown below:

In the Claims

Column 26, Line 37; In Claim 9, delete "signal)presence" and insert --signal presence-- therefor Column 26, Line 62; In Claim 10, delete "level." and insert --level-- therefor Column 27, Line 1; In Claim 10, delete "Oil" and insert --on-- therefor Column 28, Line 17; In Claim 12, delete "anotherwireless" and insert --another wireless-- therefor Signed and Sealed this
Twenty-ninth Day of October, 2019

Andrei Iancu
*Director of the United States Patent and Trademark Office*